United States Patent
Palenius et al.

(10) Patent No.: US 10,009,908 B2
(45) Date of Patent: Jun. 26, 2018

(54) METHODS OF OPERATING WIRELESS TERMINALS AND NETWORK NODES USING HIGH SPEED VEHICLE NETWORK INDICATORS AND RELATED WIRELESS TERMINALS AND NETWORK NODES

(71) Applicant: Telefonaktiebolaget LM Ericsson (publ), Stockholm (SE)

(72) Inventors: Torgny Palenius, Barsebäck (SE); Peter Alriksson, Hörby (SE); Maomao Chen, Arlöv (SE); Muhammad Kazmi, Bromma (SE); Christopher Callender, Kinross (GB); Joakim Axmon, Kävlinge (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 122 days.

(21) Appl. No.: 15/023,799

(22) PCT Filed: Jan. 19, 2016

(86) PCT No.: PCT/SE2016/050029
§ 371 (c)(1),
(2) Date: Mar. 22, 2016

(87) PCT Pub. No.: WO2016/122377
PCT Pub. Date: Aug. 4, 2016

(65) Prior Publication Data
US 2016/0360537 A1 Dec. 8, 2016

Related U.S. Application Data

(60) Provisional application No. 62/109,821, filed on Jan. 30, 2015.

(51) Int. Cl.
*H04W 4/00* (2018.01)
*H04W 72/08* (2009.01)
(Continued)

(52) U.S. Cl.
CPC ......... *H04W 72/085* (2013.01); *H04W 24/10* (2013.01); *H04W 48/08* (2013.01);
(Continued)

(58) Field of Classification Search
CPC ... H04W 72/085; H04W 72/02; H04W 24/10; H04W 48/08; H04W 76/046; H04W 88/06
See application file for complete search history.

(56) References Cited

U.S. PATENT DOCUMENTS 8,085,728 B2 * 12/2011 Chao .................... H04L 1/1854
370/331
8,693,409 B2 * 4/2014 Cave .................... H04W 68/02
370/329
(Continued)

FOREIGN PATENT DOCUMENTS

WO  WO 2008/100009 A1  8/2008
WO  WO 2014/032908 A2  3/2014

OTHER PUBLICATIONS

International Search Report and Written Opinion Corresponding to International Application No. PCT/SE2016/050029; dated May 20, 2016; 16 Pages.
(Continued)

*Primary Examiner* — Kevin Mew
(74) *Attorney, Agent, or Firm* — Sage Patent Group

(57) ABSTRACT

Methods of operating a wireless terminal may be provided. A high-speed indication may be received for a cell of a network node indicating that the cell is adapted to operate in a high-speed environment, and operation of the wireless terminal may be adapted to communicate through the cell of the network node in the high-speed environment responsive to receiving the high-speed indication. Methods of operating a node of a wireless communication network may also be provided. Communication service may be provided through
(Continued)

a cell to a plurality of wireless terminals in a high-speed environment, and a high-speed indication may be transmitted through the cell to one of the plurality of wireless terminals, with the high-speed indication indicating that the cell is adapted to operate in a high-speed environment.

20 Claims, 11 Drawing Sheets

(51) Int. Cl.
H04W 48/08 (2009.01)
H04W 24/10 (2009.01)
H04W 72/02 (2009.01)
H04W 76/04 (2009.01)
H04W 88/06 (2009.01)

(52) U.S. Cl.
CPC ......... *H04W 72/02* (2013.01); *H04W 76/046* (2013.01); *H04W 76/27* (2018.02); *H04W 88/06* (2013.01)

(56) References Cited

U.S. PATENT DOCUMENTS

| | | | |
|---|---|---|---|
| 2005/0128972 A1* | 6/2005 | Kim | H04W 24/02 370/328 |
| 2008/0194259 A1* | 8/2008 | Vujcic | H04W 74/0866 455/435.1 |
| 2008/0267130 A1* | 10/2008 | Pani | H04W 36/0055 370/331 |
| 2009/0073944 A1* | 3/2009 | Jiang | H04J 11/00 370/338 |
| 2009/0247162 A1* | 10/2009 | Yasuoka | H04W 36/32 455/436 |
| 2011/0086656 A1* | 4/2011 | Zhou | H04W 8/24 455/507 |
| 2011/0124330 A1* | 5/2011 | Kojima | H04W 36/32 455/424 |
| 2011/0188472 A1* | 8/2011 | Jeon | H04W 36/0083 370/331 |
| 2011/0194522 A1* | 8/2011 | Zhou | H04W 8/24 370/329 |
| 2011/0249549 A1* | 10/2011 | Hao | H04J 13/0062 370/208 |
| 2011/0305155 A1* | 12/2011 | Goto | H04W 72/085 370/252 |
| 2012/0026952 A1* | 2/2012 | Okubo | H04W 74/008 370/329 |
| 2012/0252432 A1* | 10/2012 | Henttonen | H04W 24/10 455/422.1 |
| 2013/0148620 A1* | 6/2013 | Nanri | H04W 74/006 370/329 |
| 2014/0095630 A1* | 4/2014 | Wohlert | H04W 4/028 709/206 |
| 2014/0128115 A1* | 5/2014 | Siomina | H04L 1/0015 455/501 |
| 2014/0133465 A1* | 5/2014 | Johansson | H04W 24/04 370/332 |
| 2014/0211606 A1* | 7/2014 | Bergman | H04W 36/08 370/217 |
| 2014/0242989 A1* | 8/2014 | Cai | H04W 52/54 455/436 |
| 2015/0031364 A1* | 1/2015 | Chen | H04W 36/023 455/436 |
| 2015/0296401 A1* | 10/2015 | Hamilton | H04W 36/0083 370/252 |
| 2016/0057666 A1* | 2/2016 | Pang | H04W 36/0083 370/252 |

OTHER PUBLICATIONS

Calle-Sanchez et al. "Top challenges of LTE to become the next generation railway communication system", Computers in Railways: Computer System Design and Operation in the Railway and Other Transit Systems, WIT Transactions on the Built Environment, vol. 127, Sep. 2012, 14 Pages.

Ericsson "Evaluation Methodology of Mobility State Dependent Performance Requirements", 3GPP TSG-RAN WG4 (Radio) Meeting #47, R4-080963, Kansas City, MO, USA, May 5-9, 2008, 4 Pages.

NTT Docomo, Inc. et al. "Motivation of New SI proposal: Performance enhancements for high speed scenario", 3GPP TSG RAN Meeting #66, RP-141849, Maui, Hawaii (US), Dec. 8-12, 2014, 4 Pages.

NTT Docomo, Inc. et al. "New SI proposal: Performance enhancements for high speed scenario" 3GPP TSG RAN Meeting #66, RP-141850, Maui, Hawaii (US), Dec. 8-12, 2014, 7 Pages.

3GPP, Technical Specification—"3rd Generation Partnership Project; Technical Specification Group Radio Access Network; Evolved Universal Terrestrial Radio Access (E-UTRA); Base Station (BS) radio transmission and reception (Release 12)", 3GPP TS 36.104 V12.6.0 (Dec. 2014), 155 pp.

3GPP, Technical Specification—"3rd Generation Partnership Project; Technical Specification Group Radio Access Network; Evolved Universal Terrestrial Radio Access (E-UTRA); Base Station (BS) and repeater ElectroMagnetic Compatibility (EMC) (Release 13)", 3GPP TS 36.113 V13.0.0 (Jan. 2016), 32 pp.

3GPP, Technical Specification—3rd Generation Partnership Project; Technical Specification Group Radio Access Network; Evolved Universal Terrestrial Radio Access (E-UTRA); Radio Resource Control (RRC); Protocol specification (Release 13), 3GPP TS 36.331 V13.0.0 (Dec. 2015), 507 pp.

Huawei et al., "RRM issues analysis in UE connected state in DRX", Agenda Item: 9.5.2, Document for: Discussion, 3GPP TSG-RAN WG4 Meeting #76bis, R4-155792, Sophia Antipolis, France, Oct. 12-16, 2015, 8 pp.

NTT Docomo, Inc. et al., "Motivation of New SI proposal: Performance enhancements for high speed scenario", Agenda item: 14.1.4, Document for: Information, 3GPP TSG RAN Meeting #66, RP-141849, Maui, Hawaii (US), Dec. 8-12, 2014, 4 pp.

NTT Docomo, Inc. et al., "New SI proposal: Performance enhancements for high speed scenario", Agenda Item: 14.1.4, Document for: Approval, 3GPP TSG RAN Meeting #66, RP-142307, Maui, Hawaii (US), Dec. 8-12, 2014, 7 pp.

* cited by examiner

Scenario1 dedicated network

Scenario2 DC or CA based

Scenario3 Pubic network with repeater

Scenario4 dedicated network with repeater

Figure 8

| Parameter | Value | |
|---|---|---|
| | HST scenario 1 | HST scenario 2 |
| Distance between sites ($D_s$) | 1000 m | 300 m |
| Distance between site and track ($D_{min}$) | 50 m | 2 m |
| Train speed ($v$) | 350 km/h | 300 km/h |
| Maximum Doppler speed ($f_d$) | 1340 Hz | 1150 Hz |

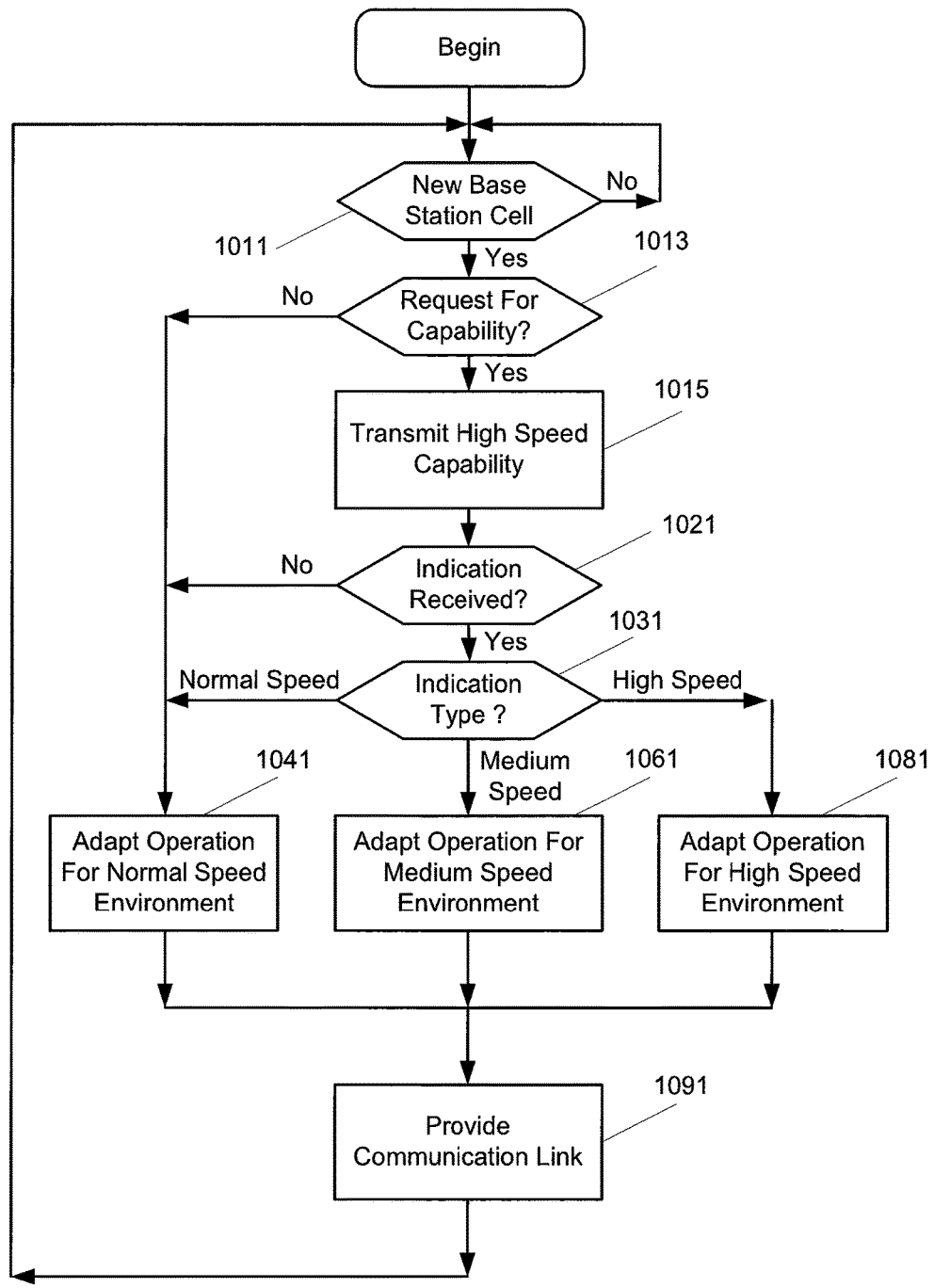

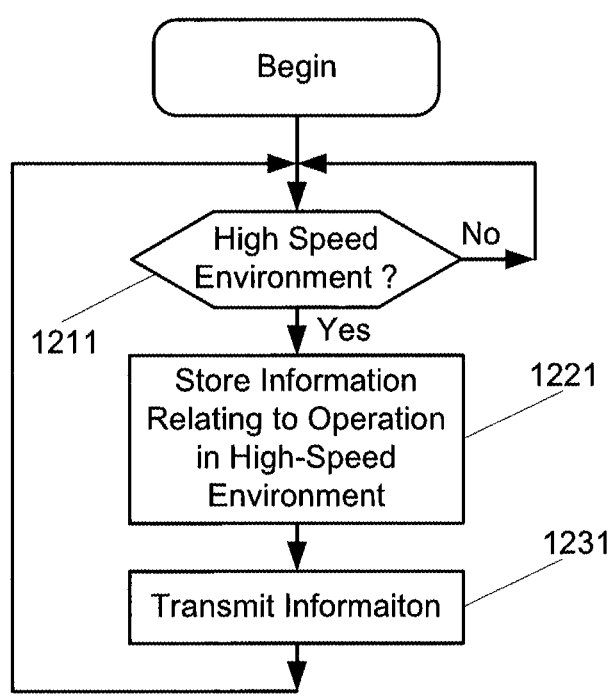

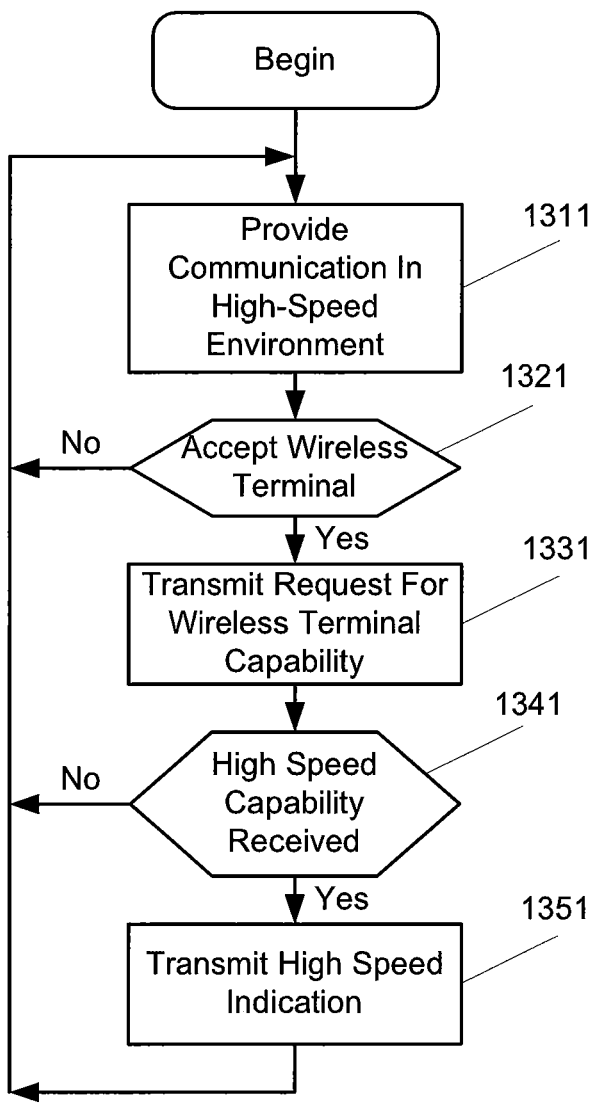

METHODS OF OPERATING WIRELESS TERMINALS AND NETWORK NODES USING HIGH SPEED VEHICLE NETWORK INDICATORS AND RELATED WIRELESS TERMINALS AND NETWORK NODES

CROSS REFERENCE TO RELATED APPLICATIONS

This application is a 35 U.S.C. § 371 national stage application of PCT International Application No. PCT/SE2016/050029, filed on Jan. 19, 2016, which itself claims the benefit of U.S. provisional Patent Application No. 62/109,821, filed Jan. 30, 2015,the disclosure and content of both of which are incorporated by reference herein in their entireties.

TECHNICAL FIELD

The present disclosure relates to the field of communications, and more particularly, to wireless communications and related methods, wireless terminals, and base stations.

BACKGROUND

In RAN#66, a study item (RP-142307) was agreed with targets to study possible enhancements to RRM (Radio Resource Management) performance in high speed train environments. The justification is that there are railways such as Japan Tohoku Shinkansen (320 km/h), German ICE (330 km/h), AGV Italo (400 km/h), and Shanghai Maglev (430 km/h) in which vehicles travel at speeds greater than 300 km/h and where there is demand for using mobile services. The high speed scenario may further include mission critical (MC) operations involving high speed vehicles in the air. An example of an MC operation is Air Ground Air communications (also known as A2G communications) where high speed vehicles may include helicopters and planes containing wireless terminals. The A2G vehicles may be served by high speed radio nodes (also known as A2G base stations, A2G eNode Bs, etc.). Speeds of helicopters and planes may be in the order of 200-300 km/hr and 400-500 km/hr respectively.

In a corresponding motivation contribution (RP-141849), several scenarios of interest to operators are disclosed. In a number of these scenarios, a dedicated network is provided for railway coverage of the cellular system (either as a standalone network, or used in conjunction with a public network which is not specifically designed to provide high speed train coverage using carrier aggregation or dual connectivity).

LTE Mobility Scenarios

There are basically two kinds of mobility scenarios in LTE (Long Term Evolution) in a RRC (Radio Resource Control) state:
1) Idle state mobility, e.g., cell selection, cell reselection, etc.; and
2) Connected state mobility: handover, RRC connection re-establishment, RRC connection release with redirection, PCell or PCC (Policy and Charging Control) change in carrier aggregation (CA), etc.

In both idle and connected states, the mobility decisions are typically based on at least one or more UE (also referred to as a wireless terminal, a mobile terminal, user equipment, a user equipment node, etc.) radio measurements, e.g., RSRP (Reference Signal Received Power), RSRQ (Reference Signal Received Quality), etc. In idle mode, the UE uses these measurements autonomously to reselect between cells, and in connected mode, the network controls mobility using measurement reports. The idle mode and connected state mobility in E-UTRAN (Evolved Universal Terrestrial Radio Access Network) could both be broadly classified into three main categories:
1) Intra-frequency mobility (in idle and connected states);
2) Inter-frequency mobility (in idle and connected states); and
3) Inter-RAT mobility towards, e.g., GSM, UTRAN, CDMA2000, WLAN, etc. (in idle and connected states).

Radio Measurements

Several radio-related measurements may be used by the UE or the radio network node to establish and keep the connection and as well to ensure the quality of a radio link.

The measurements may be used in RRC idle state operations such as, cell selection, cell reselection (e.g., between E-UTRANs, between different RATs, and to non-3GPP RATs), and reduction/minimization of drive test (MDT). The measurements may also be used in RRC connected state operations, such as, for cell change (e.g., handover between E-UTRANs, handover between different RATs, and handover to non-3GPP RATs).

The UE may first have to detect a cell, and therefore, cell identification (e.g., acquisition of a physical cell identity or PCI) may also be a signal measurement. The UE may also have to acquire the cell global ID (CGI) of a node (or cell).

The RSRP and RSRQ may be used for at least RRM measurements such as for mobility, which include mobility in RRC connected state as well as in RRC idle state. The RSRP and RSRQ may also be used for other purposes, e.g., for enhanced cell ID positioning, minimization of drive test, etc.

In RRC connected state, the UE can perform intra-frequency measurements without measurement gaps. As a general rule, however, the UE may perform inter-frequency and inter-RAT measurements in measurement gaps unless it is capable of performing them without gaps. To enable inter-frequency and inter-RAT measurements for a UE requiring gaps, the network may have to configure measurement gaps. Two periodic measurement gap patterns (both with a measurement gap length of 6 ms) are defined for LTE:
1) Measurement gap pattern #0 with repetition period 40 ms; and
2) Measurement gap pattern #1 with repetition period 80 ms.

The measurements performed by the UE are then reported to the network, which may use the measurements for various tasks.

The radio network node (e.g., base station, also referred to as an eNB, eNodeB, an evolved NodeB, etc.) may also perform signal measurements. Examples of radio network node measurements in LTE include propagation delay between a UE and itself, UL (UpLink) SINR (signal-to-interference-plus-noise ratio), UL SNR (Signal-to-noise ratio), UL signal strength, Received Interference Power (RIP), etc. The eNB may also perform positioning measurements which are described in a later section below.

The UE may also perform measurements on the serving cell (also known as the primary cell) to monitor the serving cell performance. This is also referred to as radio link monitoring (RLM) or RLM related measurements in LTE. For RLM, the UE monitors the downlink link quality based on a cell-specific reference signal (CRS) in order to detect the downlink radio link quality of the serving or PCell.

In order to detect out of sync and in sync, the UE compares the estimated quality with the thresholds Qout and Qin respectively. The thresholds Qout and Qin are defined as the level at which the downlink radio link cannot be reliably received and respectively correspond to 10% and 2% block error rate of a hypothetical PDCCH (Physical Downlink Shared Channel) transmission.

Channel state indicator (CSI) related measurements (e.g., Channel Quality Indicator CQI, Pre-coding Matrix Indicator PMI, Rank Indicator RI, etc.) are performed by the UE on a serving cell or cells (e.g., PCell, PSCell, SCells, etc. in Carrier Aggregation CA) and reported to the network node. The network node uses these measurements for maintenance of the UE's serving cell performance, e.g., scheduling, link adaptation, rank adaptation, selection of precoder matrix, etc.

A wireless terminal may desirably modify operating parameters responsive to a speed of the wireless terminal. Existing methods of determining speeds of the wireless terminal, however, may introduce undesirable delay before modifying the operating parameters.

SUMMARY

According to some embodiments of present inventive concepts, methods of operating a wireless terminal may be provided. A high-speed indication may be received for a cell of a network node indicating that the cell is adapted to operate in a high-speed environment. Operation of the wireless terminal may be adapted to communicate through the cell of the network node in the high-speed environment responsive to receiving the high-speed indication. In addition, the cell may be a first cell, the network communication link may be a first network communication link, and operation of the wireless terminal may be adapted to communicate through a second cell of a network node in a normal-speed environment.

According to some other embodiments of present inventive concepts, methods of operating a node of a wireless communication network may be provided. Communication service may be provided through a cell to a plurality of wireless terminals in a high-speed environment. A high-speed indication may be transmitted through the cell to one of the plurality of wireless terminals, with the high-speed indication indicating that the cell is adapted to operate in a high-speed environment. In addition, a high-speed capability indication may be received from the wireless terminal through the cell, and transmitting the high-speed indication through the cell to the wireless terminal may include transmitting the high-speed indication responsive to receiving the high-speed capability indication through the cell from the wireless terminal.

According to still other embodiments of present inventive concepts, a wireless terminal may include a transceiver configured to provide radio communications with a wireless communication network over a radio interface, and a processor coupled with the transceiver. The processor may be configured to receive a high-speed indication for a cell of a network node, with the high-speed indication indicating that the cell is adapted to operate in a high-speed environment, and with the high-speed indication being received through the transceiver. The processor may be further adapted to adapt operation of the wireless terminal to communicate through the transceiver and the cell in the high-speed environment responsive to receiving the high-speed indication.

According to yet other embodiments of present inventive concepts, a wireless terminal may be adapted to receive a high-speed indication for a cell of a network node indicating that the cell is adapted to operate in a high-speed environment, and adapt operation of the wireless terminal to communicate through the cell in the high-speed environment responsive to receiving the high-speed indication.

According to more embodiments of present inventive concepts, a wireless terminal may include first and second modules. The first module may be configured to receive a high-speed indication for a cell of a network node indicating that the cell is adapted to operate in a high-speed environment. The second module may be configured to adapt operation of the wireless terminal to communicate through the cell in the high-speed environment responsive to receiving the high-speed indication.

According to some further embodiments of present inventive concepts, a node of a wireless communication network may include a communication interface configured to provide radio communications with a wireless terminal over a radio interface and a processor coupled with the communication interface. The processor may be configured to provide communication service through the transceiver and a cell to a plurality of wireless terminals in a high-speed environment, and transmit a high-speed indication through the transceiver and the cell to one of the plurality of wireless terminals, with the high-speed indication indicating that the cell is adapted to operate in a high-speed environment.

According to some more embodiments of present inventive concepts, a node of a wireless communication network may be adapted to provide communication service through a cell to a plurality of wireless terminals in a high-speed environment, and transmit a high-speed indication through the cell to one of the plurality of wireless terminals. The high-speed indication may indicate that the cell is adapted to operate in a high-speed environment.

According to some additional embodiments of present inventive concepts, a node of a wireless communication network may include first and second modules. The first module may be configured to provide communication service through a cell to a plurality of wireless terminals in a high-speed environment. The second module may be configured to transmit a high-speed indication through the cell to one of the plurality of wireless terminals, with the high-speed indication indicating that the cell is adapted to operate in a high-speed environment.

According to some embodiments discussed above, delays in determining changes in speed may be reduced and/or reliability of such determinations may be improved.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 8 is a table (Table 1) illustrating parameters for the network deployment scenario of FIGS. 5A and 6 (HST Scenario 1) and for the network deployment scenario of FIGS. 5B and 7 (HST Scenario 2);

FIGS. 10, 11, and 12 are flow charts illustrating operations of a wireless terminal according to some embodiments of inventive concepts; and FIG. 13 is a flow chart illustrating operations of a base station according to some embodiments of inventive concepts.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of inventive concepts to those skilled in the art. It should also be noted that these embodiments are not mutually exclusive. Components from one embodiment may be tacitly assumed to be present/used in another embodiment.

For purposes of illustration and explanation only, these and other embodiments of inventive concepts are described herein in the context of operating in a RAN (Radio Access Network) that communicates over radio communication channels with wireless terminals (also referred to as UEs). It will be understood, however, that inventive concepts are not limited to such embodiments and may be embodied generally in any type of communication network. As used herein, a legacy or non-legacy wireless terminal (also referred to as a UE, user equipment node, mobile terminal, wireless device, etc.) can include any device that receives data from and/or transmits data to a communication network, and may include, but is not limited to, a mobile telephone ("cellular" telephone), laptop/portable computer, pocket computer, hand-held computer, an M2M device, IoT (Internet of Things) device, and/or desktop computer.

Note that although terminology from 3GPP (3rd Generation Partnership Project) LTE (Long Term Evolution) has been used in this disclosure to provide examples of embodiments of inventive concepts, this should not be seen as limiting the scope of inventive concepts to only the aforementioned system. Other wireless systems, including WCDMA, WiMax, UMB and GSM, may also benefit from exploiting ideas/concepts covered within this disclosure.

Also, note that terminology such as eNodeB (also referred to as a base station, eNB, etc.) and UE (also referred to as a wireless terminal, mobile terminal, etc.) should be considered non-limiting.

Figure 1:
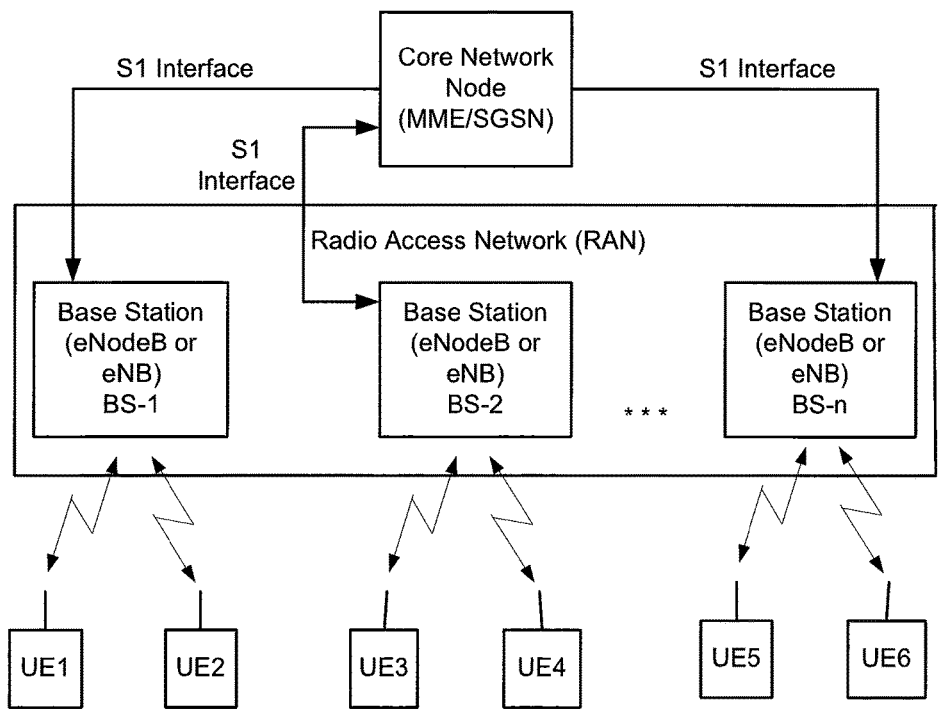
FIG. 1 is a block diagram illustrating a Radio Access Network in communication with a core network node and with wireless terminals according to some embodiments of inventive concepts.

FIG. 1 is a block diagram illustrating a Radio Access Network (RAN) according to some embodiments of present inventive concepts. As shown, communications between base stations and one or more core network nodes (e.g., Mobility Management Entity MME or Service GPRS Support Node SGSN) may be provided using respective Si interfaces. Each base station BS may communicate over a radio interface (including uplinks and downlinks) with respective wireless terminals UEs in a respective cell or cells supported by the base station. By way of example, base station BS-1 is shown in communication with wireless terminals UE-1 and UE-2, base station BS-2 is shown in communication with wireless terminals UE-3 and UE-4, and base station BS-n is shown in communication with wireless terminals UE-5 and UE-6. Moreover, base station BS-1 may be a high-speed base station with a cell or cells supporting communication in a high-speed environment (e.g., along a high speed train track), base station BS-2 may be a normal-speed base station with a cell or cells supporting communications in a normal-speed environment (e.g., in an area with city traffic), and base station BS-3 may be a medium-speed base station with a cell or cells supporting communications in a medium-speed environment (e.g., along a highway).

Figure 2:
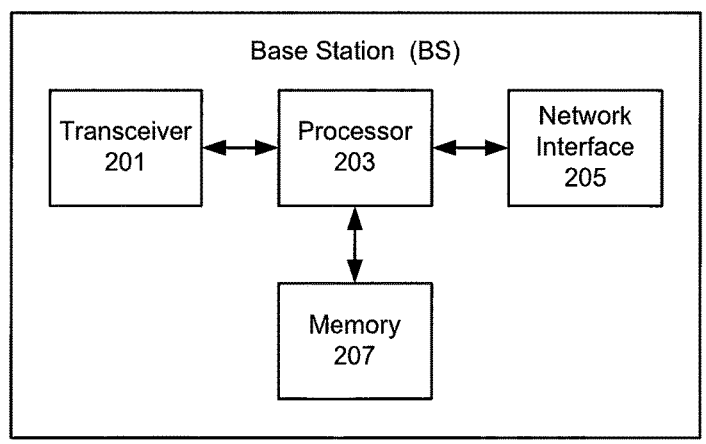
FIG. 2 is a block diagram illustrating elements of a base station of the radio access network of FIG. 1 according to some embodiments of inventive concepts.

FIG. 2 is a block diagram illustrating elements of a base station BS of FIG. 1. As shown, a base station BS may include a transceiver circuit 201 (also referred to as a transceiver or radio interface or a communication interface) configured to provide radio communications with a plurality of wireless terminals in one or more cells, a network interface circuit 205 (also referred to as a network interface) configured to provide communications with other base stations of the RAN (e.g., over the X2 interface), and a processor circuit 203 (also referred to as a processor) coupled to the transceiver circuit and the network interface circuit, and a memory circuit 207 coupled to the processor circuit. The memory circuit 207 may include computer readable program code that when executed by the processor circuit 203 causes the processor circuit to perform operations according to embodiments disclosed herein. According to other embodiments, processor circuit 203 may be defined to include memory so that a memory circuit is not separately provided. When discussing elements of base station BS-1 of FIG. 1 (e.g., operating in a high-speed environment), a "-1" may be added to reference numbers of FIG. 2 (e.g., 201-1, 202-1, 205-1, and/or 207-1). When discussing elements of base station BS-2 of FIG. 1 (e.g., operating in a normal-speed environment), a "-2" may be added to reference numbers of FIG. 2 (e.g., 201-2, 202-2, 205-2, and/or 207-2). When discussing elements of base station BS-3 of FIG. 1

(e.g., operating in a medium-speed environment), a "-3" may be added to reference numbers of FIG. 2 (e.g., 201-3, 202-3, 205-3, and/or 207-3).

Figure 3:
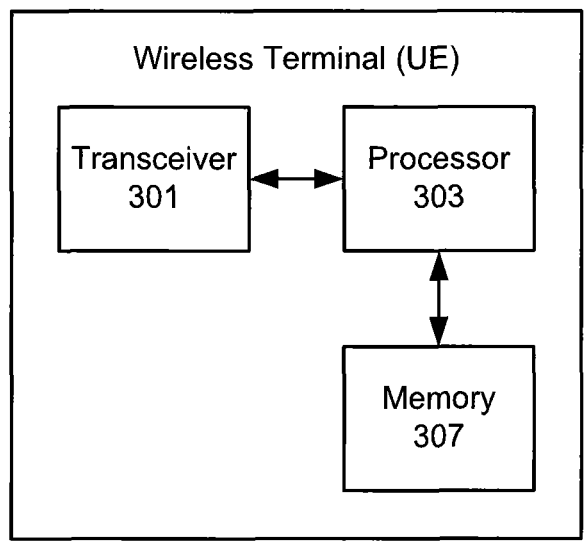
FIG. 3 is a block diagram illustrating elements of a wireless terminal of FIG. 1 according to some embodiments of inventive concepts.

FIG. 3 is a block diagram illustrating elements of a wireless terminal UE of FIG. 1. As shown, a wireless terminal UE may include a transceiver circuit 301 (also referred to as a transceiver) including a transmitter and a receiver configured to provide radio communications with a base station BS, a processor circuit 303 (also referred to as a processor) coupled to the transceiver circuit, and a memory circuit 307 coupled to the processor circuit. The memory circuit 307 may include computer readable program code that when executed by the processor circuit 303 causes the processor circuit to perform operations according to embodiments disclosed herein. According to other embodiments, processor circuit 303 may be defined to include memory so that a memory circuit is not separately provided.

Figure 4:
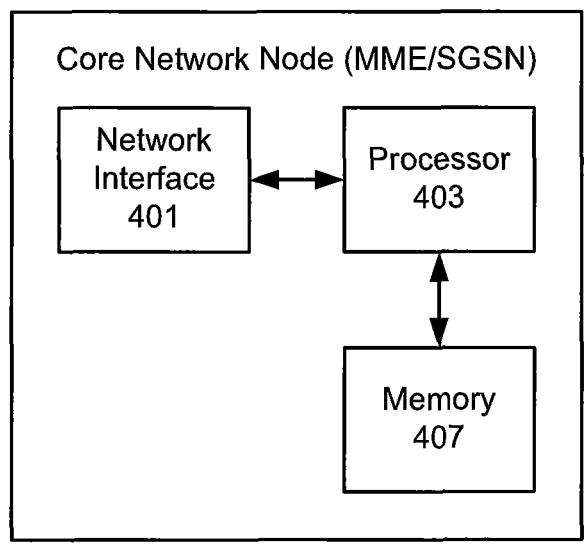
FIG. 4 is a block diagram illustrating elements of a core network node of FIG. 1 according to some embodiments of inventive concepts.
Figure 5A:
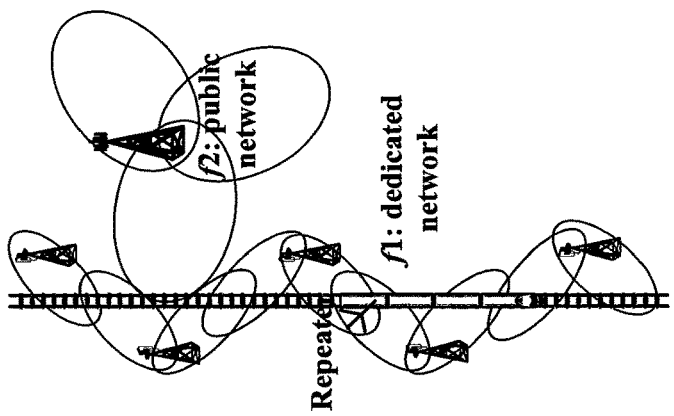
FIG. 5A is a diagram illustrating a first network deployment scenario with a dedicated high speed vehicle (train) network (HST Scenario 1) relating to some embodiments of inventive concepts.
Figure 5B:
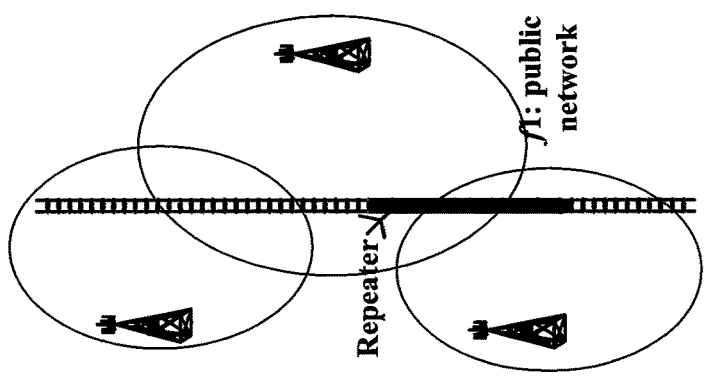
FIG. 5B is a diagram illustrating a second network deployment scenario (DC or CA based) with a dedicated high speed vehicle (train) network (HST Scenario 2) relating to some embodiments of inventive concepts.
Figure 5C:
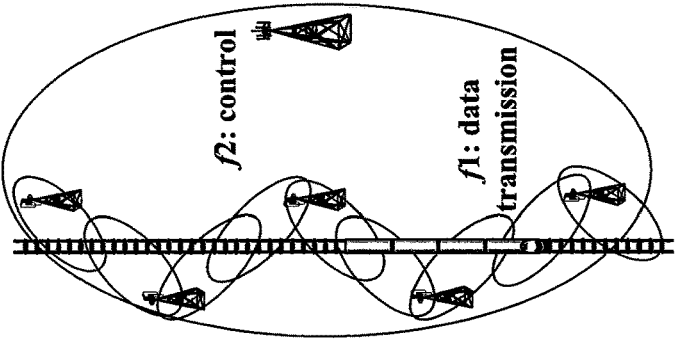
FIG. 5C is a diagram illustrating a third network deployment scenario with a public network including a repeater (Scenario 3) relating to some embodiments of inventive concepts.
Figure 5D:
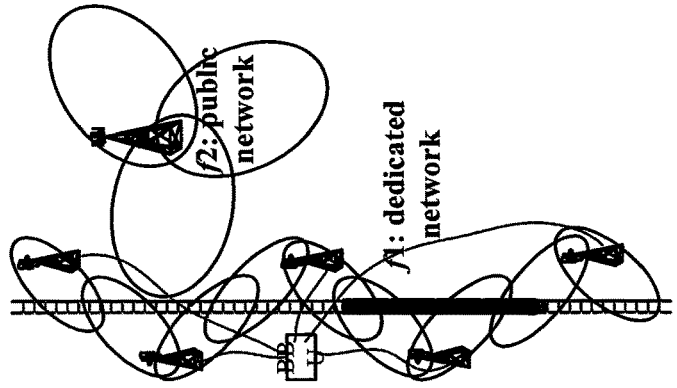
FIG. 5D is a diagram illustrating a fourth network deployment scenario with a dedicated high speed vehicle network including a repeater (Scenario 4) relating to some embodiments of inventive concepts.

FIG. 4 is a block diagram illustrating elements of a core network node (e.g., an MME and/or an SGSN) of FIG. 1. As shown, a core network node may include a network interface circuit 401 (also referred to as a network interface or a communication interface) configured to provide communications with base stations of the RAN (e.g., over the Si interface), a processor circuit 403 (also referred to as a processor) coupled to the network interface circuit, and a memory circuit 407 coupled to the processor circuit. The memory circuit 407 may include computer readable program code that when executed by the processor circuit 403 causes the processor circuit to perform operations according to embodiments disclosed herein. According to other embodiments, processor circuit 403 may be defined to include memory so that a memory circuit is not separately provided.

Speed dependent scaling of reselection parameters may be used whereby the UE counts reselections during a configurable time period $T_{CRmax}$ and determines if the number of reselections is greater than $N_{CR\_M}$ (specifying a maximum number of cell changes to enter Medium-mobility state) or $N_{CR\_H}$ (specifying a maximum number of cell reselections to enter High-mobility state). Based on this determination, the UE may determine that it is in a medium or high mobility state. When moving back to normal mobility state, an additional time period $T_{CRmaxHyst}$ may be configured, where $T_{CRmaxHyst}$ specifies the additional time period before the UE can enter Normal-mobility state.

When a UE determines that it is in a high mobility state, the UE may apply scaling factors to some of the reselection parameters including Qhyst, $Treselection_{EUTRA}$, $Treselection_{UTRA}$ $Treselection_{GERA}$ and $Treselection_{CDMA\_1 \times RTT}$. Scaling Factors 0.25, 0.5, 0.75, or 1.0 may be applied. This example is given for E-UTRA, but similar functionality may also be configured in UTRA.

In RRC connected states, similar functionality may be used. In RRC connected states, cell changes correspond to handover rather than reselection, but the principle is the same/similar. The UE counts cell changes during a configurable time period, and makes a determination of normal/medium/high mobility state. The timeToTrigger parameters in ReportConfigEUTRA and in ReportConfigInterRAT are multiplied with the scaling factor applicable for the UE's speed state.

Because the basic algorithm works by counting reselections during a configurable time period, there is necessarily a delay before a speed state change is detected by the UE. For example, if a high speed train leaves a station, there will be a period of time when the UE still considers that it is in normal mobility state even though it may have accelerated to high speed. Degraded mobility performance may be expected throughout this time, because the UE is not applying high speed scaling to the parameters. Moreover, if the UE went out of service (e.g., in a tunnel) while moving at high speed, the UE would miss reselections from its reselection history during the time it was out of service.

In addition, only a limited set of RRC parameters can be scaled, since the functionality is to apply a scaling factor of 0.25, 0.5, 0.75, or 1.0 to an existing parameter. There are many other parameters which could potentially be improved/optimized for high speed operation. Such parameters may include either layer 1 parameters specified by 3GPP standards, examples of which may include layer 1 measurement period, reselection evaluation time (Tevaluate), UE implementation specific parameters such as filtering schemes used in time and frequency tracking of cells, channel estimation, etc. Especially for implementation specific parameters, since the basic parameter is not part of 3GPP specifications, it may also be completely unclear to configure a scaling factor to modify the parameter.

Also, the accuracy of the speed state determination may not be perfect. Accuracy was studied earlier by RAN4. There may always be a possibility that a UE will make a wrong determination of mobility state. Hence, there may be undesirable side effects when a network configures speed dependent scaling such as UEs which are not being operated on the high speed train network making a medium or high mobility state determination, or vice versa, UEs which are on the high speed rail network not making a high speed determination. In practice, it may be quite difficult to find a good parameter set which ensures accurate mobility state detection while at the same time not incurring too long delays in making the determination.

According to some embodiments of inventive concepts where a dedicated network serves high velocity UEs, the network node (e.g., serving cell) may provide an explicit indication to UEs that they are being operated in a high speed environment in a cell or in a group of cells operating on the same carrier or distributed over different carriers. When this indication is provided, UEs may operate in a high speed mode of operation, where algorithms or procedures for receiving radio signals are improved/optimized by the UE for the operating environment. Further details and examples of improvement/optimization are provided in the following discussion.

In other embodiments of inventive concepts, a UE may acquire an explicit indication about high speed operation from one or more cells, store or log the acquired explicit indication(s), and transmit the logged information to the network node.

In yet other embodiments of inventive concepts, a UE may signal its capability to the network node (with the capability being associated with acquisition of the explicit indication, improvement/optimization of algorithms or procedures based on acquired indication, logging and report of indication to the network node, etc.).

According to some embodiments, delays due to a UE needing to count cell changes to determine that it is not in normal mobility state may be reduced. Modification of parameters may not be limited to L3 parameters such as Treselection or time to trigger. It may also be possible to modify/optimize parameters for which a simple scaling factor such as 0.25, 0.5, or 0.75 would not be appropriate (e.g., a dB threshold or an L1 UE implementation based parameter). Configuring an indicator to a UE that it is operating at high speed may be relatively simple, and the configuration may not be likely to impact UEs which are not connected to the dedicated high speed train network. With such an indication, the UE can use longer averaging time to estimate CSI (Channel State Information) status in order to get more accurate channel status without performing an operation to identify the high speed scenario.

FIG. 5 (reproduced from RP-141849) shows four scenarios of interest for operators for high speed trains.

For scenarios 1, 2 and 4, a dedicated high speed vehicle network is deployed (i.e., a network which is intended for the primary/sole use of UEs in high speed vehicles and which is not intended to be used by UEs operating outside of the high speed environment). In such a network, the network nodes (e.g., base stations) and their associated parameters (e.g., transmit power, antenna gains, etc) may be customized for a particular type of deployment. For example, a dedicated high speed vehicle network can be deployed to serve UEs on the motorway or freeway where the vehicular speed can be typically within certain limits (e.g., between 100 km/hr and 150 km/hr). As an example, the base stations may be deployed along the motorway, and heights of the base stations may depend on the terrain (e.g., whether it is hilly or flat).

An operator may also deploy a network which is specifically tailored for use by UEs operating in a high speed train (HST). This is a special case of a high speed vehicular network specifically designed for serving UEs in the high speed train. More specifically, such an HST network may differ with respect to a network designed for normal speed in terms of one or more parameters or characteristics associated with network nodes (e.g., base stations) within the network. In an HST network, for example, the inter-site distance between base stations may depend on the typical, average, and/or maximum speed of the trains traversing the HST network. In yet another example, in an HST network, the base stations may employ directional antennas depending on the typical, average, and/or maximum speed of the trains traversing the HST network (e.g., highly directive antennas pointing towards the train if the train speed is above a threshold, such as 300 km/hr).

Figure 6:
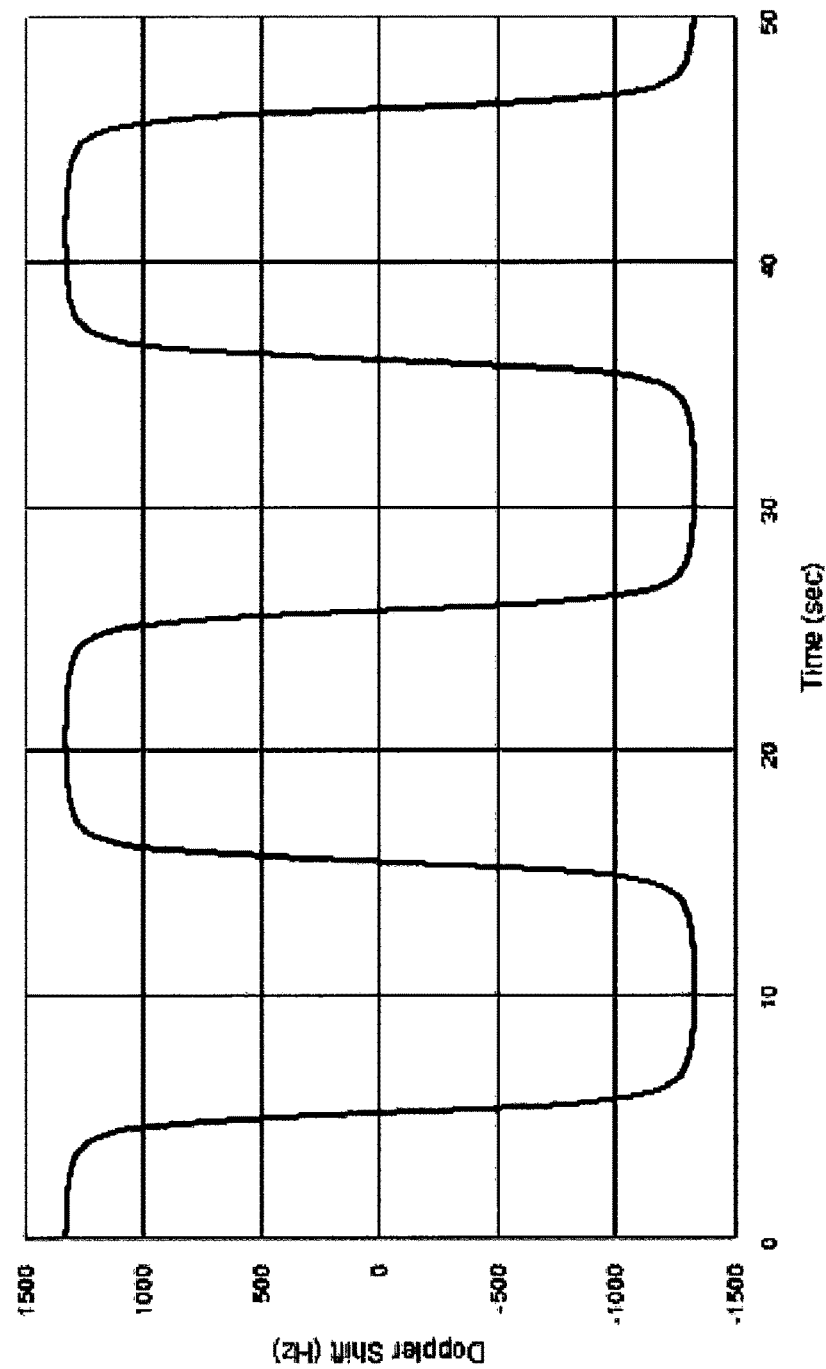
FIG. 6 is a graph illustrating deployment parameters (including a Doppler shift trajectory) for the network deployment scenario (Scenario 1) of FIG. 5A.
Figure 7:
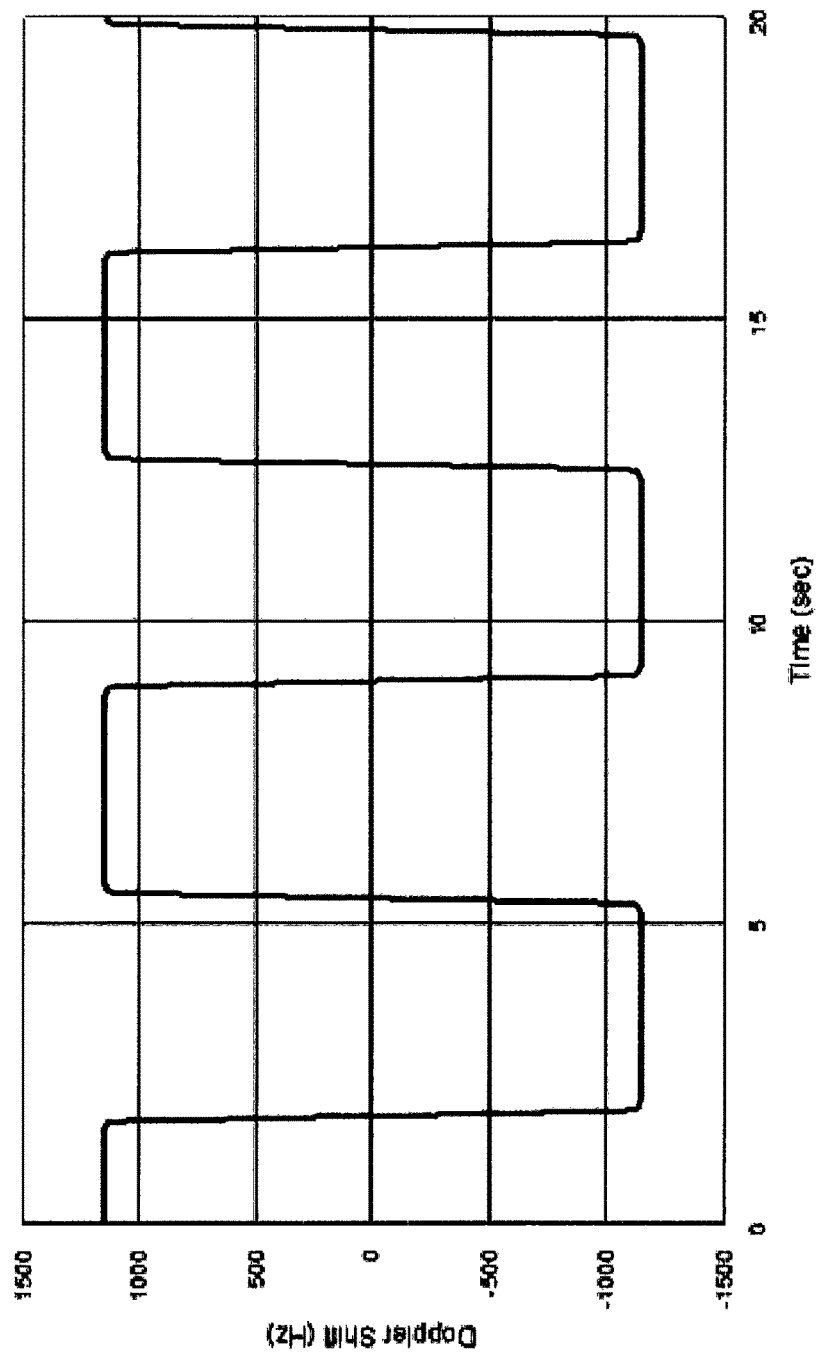
FIG. 7 is a graph illustrating deployment parameters (including Doppler shift trajectory) for the network deployment scenario (Scenario 2) of FIG. 5B.

Non-limiting examples of deployment parameters associated with different HST networks, HST #1 and HST #2, are shown in FIGS. 6 and 7 respectively. These HST scenarios are reproduced from 3GPP TS 36.104. The corresponding parameters for these HST scenarios are expressed in the table of FIG. 8. The figures show that the HST scenarios 1 and 2 differ in terms of deployment parameters such as distance between base station sites, maximum speed of the train, minimum distance between a base station and the track of the train, and maximum Doppler speed.

In some scenarios, carrier aggregation or dual connectivity may be used to combine connectivity from the dedicated high speed vehicle network with connectivity from the so called public network, which should be understood as a network which has not been specifically provided for high speed vehicle users (i.e., a network which provides service to UEs operating also at lower speeds).

Method in a Network Node of Signaling Indication about Deployment

According to some embodiments, a network node may provide an explicit indication (also known as a single-indicator) to UEs that the deployment is a high speed vehicle deployment or a high speed vehicular network (HSVN). A high speed vehicle network can be a dedicated high speed vehicle network, or it can be any kind of HST network, or it can be any kind of network capable of handling normal UEs as well as high speed UEs up to a certain speed. Therefore, the indicator does not distinguish between various kinds of HSVN deployments. As an example, the indicator can be 1-bit message (e.g., 1 means HSVN whereas 0 means normal network). In another example, the network node may transmit the indicator to the UE only if the network node belongs to HSVN. The indicator may be cell specific or it may be specific to one or a group of carrier frequencies. In the former case, for example, the serving network node may indicate to the UE that the network node belongs to a HSVN. The serving network node may also indicate to the UE whether one or more neighbor cells belong to the HSVN. In the latter case (i.e., indicator per carrier or per group of carriers), the indicator informs the UE that all cells on a carrier frequency (e.g., f1) or all cells on a group of carriers (e.g., f1, f2, . . . , fn) belong to HSVN (i.e., the cells operate using principles associated with HSVN and can adequately serve high speed UEs).

According to other embodiments, two or more indicators (also knows as multi-indicators or multiple-indicators) may be pre-defined corresponding to different kinds of deployment network node. The network node transmits one of the pre-defined indicators corresponding to the actual type of HSVN. The indicators may be specific to a cell or specific to all cells per carrier frequency or per group of carrier frequencies. For example, two kinds of HSVN indicators (e.g., HS-ID=0 and HS-ID=1) respectively corresponding to HSVN for motorway and HST may be pre-defined. The network node may transmit HS-ID=0 for UEs entering or operating in the HSVN in the motorway environment. For example, all the network nodes within HSVN along the motorway may transmit the indicator with HS-ID=0. On the other hand, all the network nodes within HSVN along the HST may transmit the indicator with HS-ID=1. In yet another example of multi-indicator signaling, two or more indicators may be pre-defined for different types of HST environments. For example, three indicators HS-ID=0, HS-ID=1 and HS-ID=2 respectively corresponding to HST up to 300 km/hr, HST between 300 km/hr-350 km/hr, and HST above 350 km/hr may be pre-defined. The network node signals the most relevant indicator that corresponds to the actual speed of the train housing the UEs.

In yet another example, the multi-indicator may be broadly categorized into two or more major indicators and each major indicator can have a sub-class. As example, two major multi-indicators HS-ID=0 and HS-ID=1 may respectively correspond to HSVN in a non-HST environment and HSVN in an HST environment. Each major multi-indicator may also be associated with different levels of UE speed. As an example, HS-ID=00 and HS-ID=01 may respectively correspond to HSVN in non-HST environment for up to medium speed (e.g., 150 km/hr) and above medium speed. Similarly, HS-ID=10 and HS-ID=11 may respectively correspond to HSVN in an HST environment for up to medium speed (e.g. 300 km/hr) and above medium speed.

According to other embodiments, one more indicators may correspond to the number of subframes the network recommends for the UE to perform CSI estimation. Under HSVT, the BS may schedule a certain amount of resources to a certain UE and with CSI estimation under a certain number of subframes from the UE may improve/optimize the system throughput. An example of the indicator may use a direct number of subframes. Another example of the indicator may use an integer from 1 to 10 to represent the multiple time of one radio frame which is 10 subframes (10 ms) for an LTE system.

This may be applied to UTRA, E-UTRA, GSM, or any other radio access technology used in such deployments. Such an indication(s) may either be broadcast as part of the system information (e.g., in a System Information Block SIB transmitted on a broadcast channel) in the cell, and/or otherwise indicated to the UE by any other signaling, for example, as part of a handover message when a UE moves from an area where no dedicated high speed coverage is provided into an area where dedicated high speed vehicle coverage is provided. Non-limiting examples of network nodes which could provide this information may include NodeBs, e-NodeBs, RNCs (Radio Network Controllers), base stations, BSCs (Base Station Controllers), access points, base transceiver stations (BTSs), remote radio heads (RRHs), remote radio units (RRUs), relays, core network nodes, etc. The UE can be any type of wireless terminal/device capable of communicating with a network node and/or with another wireless terminal/device over a wireless link. Non-limiting examples of a UE may include a mobile terminal, laptop, USB, embedded device, machine type communication (MTC) capable device, machine to machine capable device, device to device (D2D) capable UE (also known as a proximity service or ProSe UE), etc.

Method in a UE of receiving and using indication about deployment

The UE may receive an indicator corresponding to a high speed vehicular network (HSVN) from a network node as described above. Based on the received indicator, the UE may determine that it is operating in at least a high speed vehicle network (HSVN). In case the indicator is cell specific, the UE may determine that the cell belongs to an HSVN (i.e., by comparing the cell ID in the received message with the ID of a cell, such as, a serving cell or neighbor cell). In case the indicator is carrier specific or specific to a group of carriers, then the UE may determine the carrier(s) that belong to the HSVN (e.g., by comparing the carrier information, such as, ARFCN, EARFCN, UARFCN, etc., in the received message with the carrier information of configured carriers, such as, primary serving cell carrier, inter-frequency carrier, secondary component carrier, inter-RAT carrier, etc.). In case the received indicator is one of the two or more pre-defined indicators, then the UE may further determine the type of high speed vehicle network (HSVN) based on pre-defined mapping between the indicator and the type of HSVN.

After determining that it is operating on a high speed vehicle network (HSVN), the UE may modify its operation to a mode adapted/optimized for high speed operation. The UE may also adapt its mode of operation depending upon the kind of HSVN in which the UE operates. This may require the UE to implement different types of operations, algorithms, and/or procedures which are customized for the UE operation in different kinds of HSVN or at different levels of UE speeds in HSVN. For example, the UE may have to implement two or more sets of operations, algorithms, and/or procedures for the same type of operation, such as for RSRP/RSRQ measurements: one procedure for normal (i.e., non-HSVN) operation and another one or different types of procedures for operation in HSVN. Some aspects of an operating mode adapted/optimized for high speed operation may be specified and standardized to ensure that different devices operate consistently. In addition, some implementation specific adaptations/optimizations may be performed.

Some non-limiting examples of such adaptations/optimizations are discussed below.

According to some embodiments, a layer 1 measurement period (L1 measurement period) may be reduced so that less filtering is performed by UEs on the measured values for performing one or more radio measurements (e.g., RSRP, RSRQ, etc.). In this case, a shorter measurement period and relaxed measurement accuracy requirements may be specified since it may not be feasible to meet existing requirements with reduced filtering of measurement(s). For example, the UE may use an L1 period of 100 ms when operating in HSVN and an L1 period of 200 ms when operating in normal network to perform RSRP and/or RSRQ measurements.

According to some embodiments, filtering in UE time and frequency tracking may be modified. When operating in HSVN, for example, a shorter time constant may be used so that the tracking filters can more rapidly track sudden changes in timing or frequency. This is because at higher speed (due to shorter coherence time and shorter coherence bandwidth) the signal may change more rapidly in time and frequency. The modified filtering can be used for any type of radio measurements (e.g., cell identification, measurements such as RSRP/RSRQ, Radio Link Monitoring RLM, cell selection/reselection, etc.) and/or for demodulation of channels (e.g., PDSCH, PDCCH/PCFICH, PHICH, PBCH, EDPCCH, etc.). Another example is to use a longer time period for the estimation filter for CSI (Channel State Information) estimation. This is because the CSI fed back to BS under high speed based on one subframe may be outdated due to reporting delay. With longer time filtering, the system performance may be improved with CSI to reflect better channel status.

Figure 9:
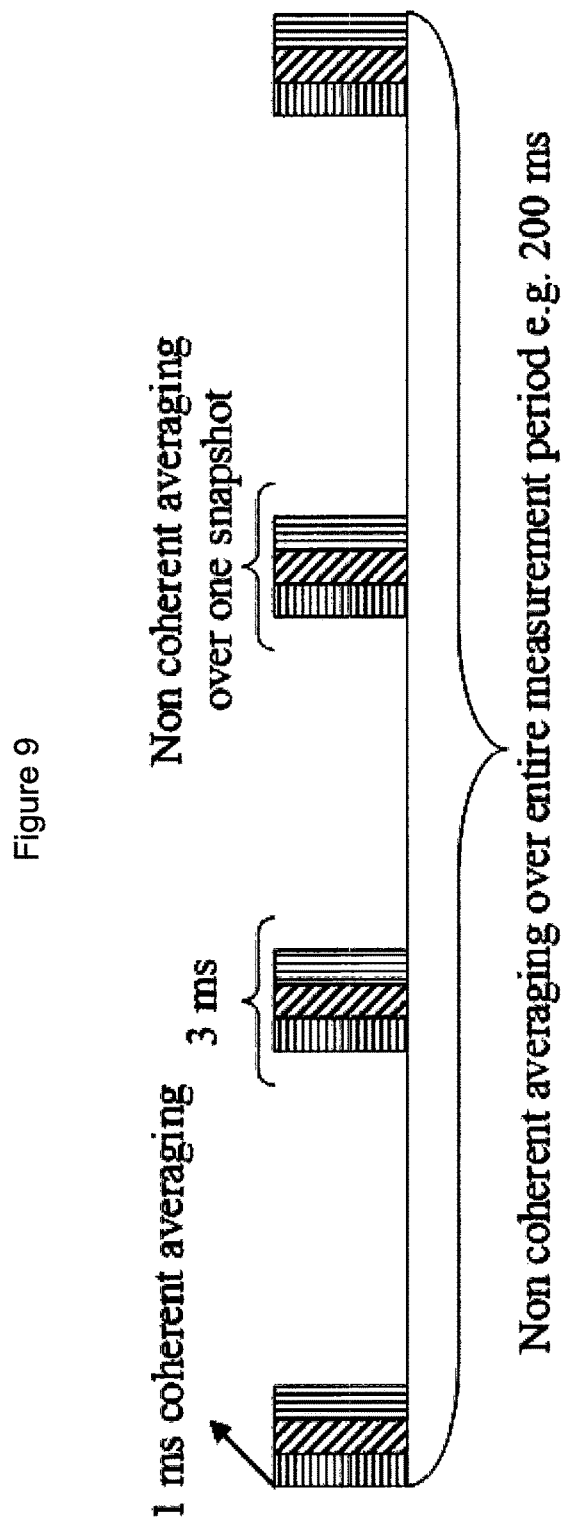
FIG. 9 is a diagram illustrating examples of coherent and non-coherent measurement (RSRP or RSRQ) filtering/averaging in an E-UTRAN UE over an entire measurement period (e.g., 200 ms) according to some embodiments of inventive concepts.

Performing reduced (i.e., less or no) coherent averaging of CRS symbols in either time domain or frequency domain. At lower speeds, the coherent averaging may be performed over a time duration and frequency (e.g., bandwidth) over which the radio channel characteristics may remain relatively constant. At higher speeds, the coherence time and bandwidth may be reduced compared to the operation at lower speeds. The overall serving cell or neighbor cell measurement quantity results may include non-coherent averaging of 2 or more basic non-coherent averaged samples. An example of such measurement filtering for RSRP/RSRQ in LTE is illustrated in the diagram of FIG. 9.

A shorter measurement evaluation time may be used in idle mode when the UE receives an indicator related to HSVN operation. In Idle mode, the UE autonomously performs cell reselection to a neighbor cell based on parameters configured by the network node. To achieve this objective, the UE evaluates whether a new cell meets the reselection criteria over an evaluation time (T1) and measures a detected cell over a measurement time (T2) based on pre-defined rules. In this case, a shorter minimum evaluation requirement can be specified for use by the UE when the UE operates in HSVN. The evaluation requirement can be expressed in terms of evaluation time, measurement time, etc. For example, it may be pre-defined that when the UE receives the indicator associated with HSVN operation on a cell or a carrier, then the UE should evaluate and measure the cell for the cell reselection using T1 and T2 respectively, and otherwise the UE should evaluate and measure the cell for the cell reselection using T1' and T2', respectively (where T1<T1' and T2<T2'). For a DRX cycle of 640 ms, examples of T1, T2, T1' and T2' may be T1=0.64*20 s, T2=0.64 s, T1'=0.64*28 s, and T2'=1.28 s.

A more accurate system clock may be used during DRX (Discontinuous Reception) when the UE is configured with the indicator associated with HSVN operation in a cell or cells of one or more carriers. During a DRX cycle, the UE wakes up during each ON duration to read control channels such as PDCCH and E-PDCCH, and the UE may also perform radio measurements during the ON duration. A more accurate clock may enable the UE to more accurately maintain the system timing and information about stored data, etc., since at higher speed, the signals may vary at a higher rate. When operating in an HSVN network, for example, the UE may not use the deepest sleep (power saving) modes (where the UE may maintain system timing using a low frequency and low accuracy oscillator). From a UE perspective, the timing error after DRX may be caused by both changes in propagation conditions and internal errors due to UE clock drift relative to the eNB clock. By using a more accurate (and more power consuming) UE oscillator, a greater contribution from the changes in propagation conditions may be tolerated by the UE, as would be expected in a high speed environment.

When in a high speed environment, the UE may allow/use larger time inaccuracy margins when waking up after a deep sleep. By using larger time inaccuracy margins, the UE may accommodate larger oscillator frequency errors due to Doppler shifts as well as a larger time inaccuracy due to the high speed, and the UE may thereby accommodate larger distance differences between the measurement occasions.

When in a high speed environment, the UE may perform more frequent measurement samples and time/frequency updates in idle mode, or in DRX states. When under HSVN operation, for example, the UE may obtain more frequent measurement samples in the time and/or frequency domains during the same L1 measurement period compared to the normal scenario (i.e., non-HSVN operation). The more frequent measurement sampling may increase the accuracy of the measurement. Under HSVN operation, for example, the UE may use up to 10 snapshots or measurement samples over 200 ms to measure RSRP and/or RSRQ. Under normal operation, however, the UE may use up to 4 or 5 snapshots or measurement samples over 200 ms for measuring RSRP or RSRQ.

When in a high speed environment, the UE may use more advanced signal processing for cell detection to identify upcoming candidates for handover or reselection earlier (i.e., at lower SINR than otherwise meaningful) to allow sufficient preparation time for handover or cell reselection. This may, for example, include interference cancellation, interference rejection, and/or beamforming of the received signal, or use of an increased number of UE Rx antennas—if available—to perform cell detection (allowing higher antenna gain or rejection of more interferers). This may also include using several techniques in parallel instead of using only a single technique at each measurement occasion, at the price of higher baseband processing activity and thus higher power consumption.

When in a high speed environment, the UE may remove previous serving cells from the cell database after re-selection or handover to a new cell, thus releasing signal processing capacity that can be used to monitor more candidates from the cell detection. This may also relieve more memory that can be used to monitor more candidates from the cell detection.

When in a high speed environment, the UE may use more radio time for each intra-frequency measurement occasion to get more accurate information on present conditions (alternative to relaxing requirements). During a measurement occasion, the UE may obtain a snapshot which may contain multiple non-coherent samples.

When in a high speed environment, the UE may modify thresholds for radio link monitoring (RLM). The RLM thresholds include an in-sync threshold (Qin) and an out-of-sync threshold (Qout). The UE regularly compares the DL radio quality of the UE's serving cell with the pre-defined RLM thresholds to determine whether the UE is in sync or out of sync with respect to the serving cell. Currently Qin and Qout are expressed as 2% and 10% of hypothetical BLER (Block Error Rate) of PDCCH respectively. It may be pre-defined that when operating in HSVN, the UE may use different values of Qin and Qout compared to the values used under normal operation. Under HSVN, for example, the UE may be required to use Qin and Qout corresponding to 4% and 12% of hypothetical BLER of PDCCH respectively. This may reduce instances of the UE going into out of sync too early at higher speed and may increase the time that the UE will stay in sync.

Method in a UE of Logging and Transmitting Indication about High Speed Vehicular Deployment According to some embodiments of inventive concepts, the UE may be configured by the network node to log or store the received information about the indicator related to HSVN operation on a cell or a carrier. The UE may be further configured to log or store additional information associated with the indicator (e.g., timestamp or reference time when logging is done, location where logging is done, cell ID, CGI, carrier information such as ARFCN, etc.). The UE may be further configured to report the logged information (e.g., statistics, logged history, etc.) about the received indicator to the network node (e.g., to the PCell).

When in a high speed environment, the UE may also be configured to report any acquired information about the HSVN from any cell which is different than the PCell. For example, the UE may acquire the indicator related to HSVN operation on a cell or a carrier by reading the system information of a first cell. The first cell can be any cell other than the PCell and can belong to any serving or non-serving carrier frequency.

The network node may receive statistics about the indicator related to HSVN from a plurality of UEs. The information about the indictor received by the network node may be used for network management tasks which may include self organizing of network parameters, tuning of radio parameters such as transmit power adjustment or antenna tilting, network planning, etc.

Method in a UE of Signaling Capability Associated with Handling of Operation in High Speed Vehicular Deployment All UEs may not be capable of receiving and applying the indicator related to HSVN operation. According to some embodiments, a UE which is capable of receiving and using or applying the HSVN indicator related to HSVN (i.e., any of the aspects described above) may also inform the network node that it supports such capability. The UE may report the capability to the network node via RRC signaling (e.g., to an eNB, BS, MME, RNC, BSC etc.). The UE may also include additional or specific information in the capability message which may comprise of one or more of the following:

1) Information that the UE is capable of receiving the indicator and is also capable of adapting its operation related to reception of radio signals;
2) Information that the UE is capable of receiving the indicator and is also capable of adapting its operation related to reception of radio signals for specific tasks (e.g. RRM measurements, UE demodulation, CSI measurements, logging of indicator, reporting of logged indicator, etc.);
3) Information that the UE is capable of receiving the indicator and is also capable of adapting its operation related to reception of radio signals, for example, only for certain frequency bands or for indicated frequency bands or for frequency bands above certain frequency, such as above 2 GHz;
4) Information that the UE is capable of performing any of the above tasks on different carriers for up to a certain number of configured or pre-defined number of carriers (e.g., information that the UE is capable of performing RRM measurements and meeting requirements under HSVN for only up to 3 LTE carriers in parallel;

5) Information that the UE is capable of performing any of the above tasks only in a certain RRC activity state (e.g., in connected state, etc.); and/or 6) Information that the UE is capable of performing any of the above tasks related to different types of pre-defined indicators and is capable of adapting operation depending upon the type of indicator received from the network node.

The acquired capability information may be used by the receiving network node to perform one or more radio operation tasks or radio resource management actions. Examples of radio operation tasks may include:

1) Deciding whether to configure the UE with an indicator related to HSVN operation to enable the UE to adapt its radio parameters, etc.; and/or
2) Deciding whether to transmit one (general indicator) or a specific indicator to enable the UE to adapt its radio parameters used to receive signals.

The UE may send the capability information to the network node proactively or in response to an explicit request received from the network node.

According to some embodiments of inventive concepts, a network node may be dedicated to providing coverage to user equipment nodes UEs in high speed vehicles, and the network node may provide an indication that it is dedicated to this purpose. A user equipment node UE may act on this indication to adapt/optimize its operation to high speed operation.

Discussion of Flow Chart

Figure 10:
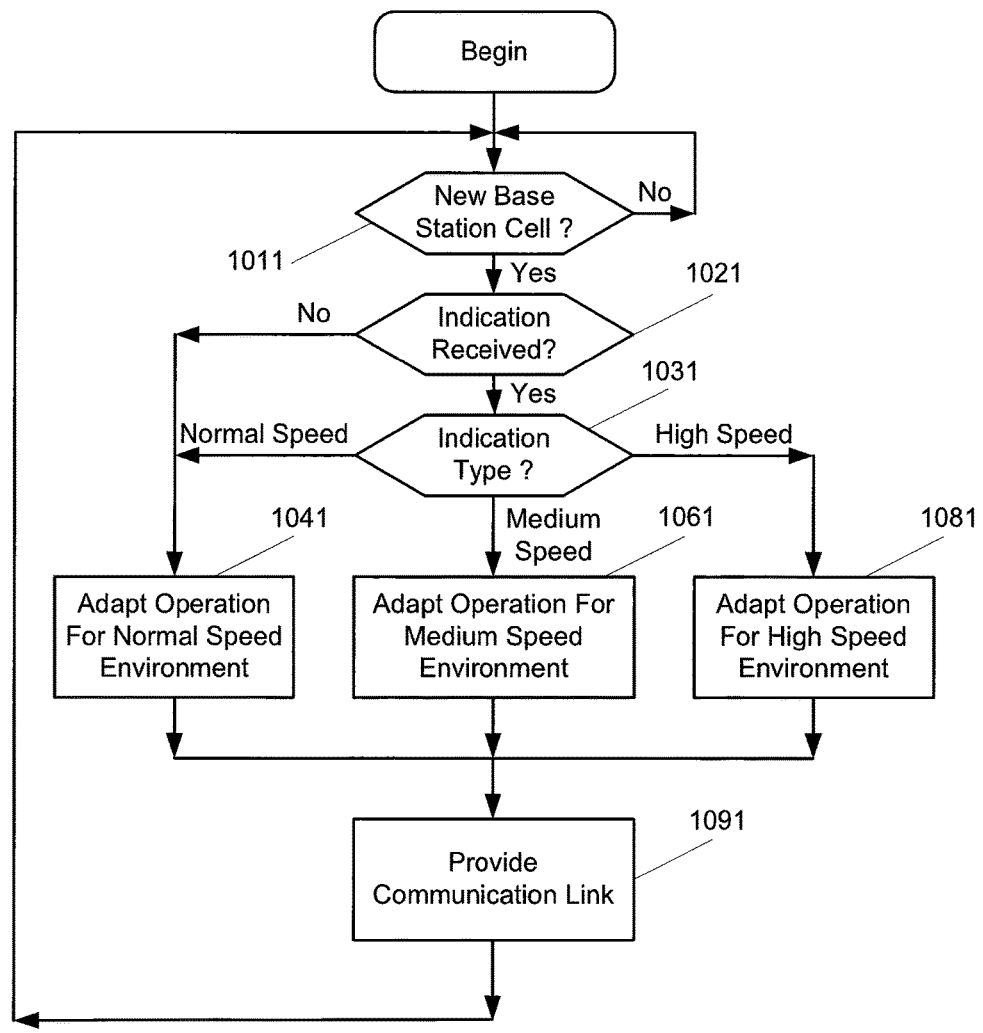

Operations of a wireless terminal UE will now be discussed in greater detail below with respect to the flow chart of FIG. 10. UE processor 303 may wait at block 1011 until a new base station cell is selected/acquired. If the UE is in an RRC idle state, UE processor 303 may select/acquire a new base station cell during cell selection/reselection. If the UE is in an RRC connected state, UE processor 303 may select/acquire a new base station during handover, RRC connection re-establishment, RRC connection release with redirection, PCell or PCC change in carrier aggregation, etc.

If a new cell is selected/acquired at block 1011, UE processor 303 may determine if a high/medium/low speed indication for the selected/acquired cell is received through transceiver 301 at block 1021. If no indication is received at block 1021, processor 303 may adapt operation of the wireless terminal UE for normal speed operation at block 1041. A legacy base station, for example, may not provide speed indications, and in such cases, wireless terminal processor 303 may default to adapting operation for normal speed environments.

If a high/medium/low speed indication is received for the selected/acquired cell through transceiver 301 at block 1021, wireless terminal processor 303 may determine the meaning of the indication at block 1031. Responsive to the indication being a normal speed indication at block 1031, wireless terminal processor 303 may adapt operation of the wireless terminal UE for normal speed operation at block 1041. Responsive to the indication being a medium speed indication at block 1031, wireless terminal processor 303 may adapt operation of the wireless terminal UE for medium speed operation at block 1061. Responsive to the indication being a high speed indication at block 1031, wireless terminal processor 303 may adapt operation of the wireless terminal UE for high speed operation at block 1081.

Wireless terminal processor 303 may then provide a communication link through transceiver 301 and the selected/acquired cell at block 1091, with processor 303 adapting operation for normal, medium, or high speed environments as discussed above with respect to blocks 1041, 1061, and 1081. Until another cell is selected/acquired at block 1011, wireless terminal processor 303 may continue providing the communication link with operations adapted to a normal, medium, or high speed environment (as discussed above with respect to blocks 1031, 1041, 1061, and 1081 until another base station cell is selected/acquired at block 1011. As wireless terminal UE moves through a communication network, processor 303 may determine a speed for an environment for each selected/acquired base station cell, and adapt operations accordingly.

By way of example, wireless terminal UE may move into a high speed environment served by a first base station cell, and processor 303 may select/acquire the first base station cell at block 1011. For example, a user of the wireless terminal UE may board a high speed train with network service being provided through a base station cell or cells adapted to provide service along the track of the high speed train, and each base station cell in the high speed environment may transmit an indication of the high speed environment. Processor 303 may receive the high speed indication through transceiver 301 at block 1021, processor 303 may determine that the indication is a high speed indication at block 1031, processor 303 may adapt operation of the wireless terminal for high speed operation at block 1081, and processor 303 may provide communication through the selected/acquired base station cell at block 1091 with operation adapted for high speed until a new base station cell is selected/acquired at block 1011. While on the high speed train, for example, processor 303 may maintain operations adapted for high speed as wireless terminal UE moves from one high speed base station cell to another as long as a high speed indication is received by processor 303 (through transceiver 301) for each of the base station cells.

Once the user of the wireless terminal UE leaves the high speed train, wireless terminal UE may enter a normal speed environment. For example, the user may walk with the wireless terminal to a car and drive away on relatively low speed city streets. Processor 303 may thus select/acquire a new base station cell in the normal speed environment at block 1011. Accordingly, processor 303 may receive the normal speed indication through transceiver 301 at block 1021, processor 303 may determine that the indication is a normal speed indication at block 1031, processor 303 may adapt operation of the wireless terminal for normal speed operation at block 1081, and processor 303 may provide communication through the selected/acquired base station cell at block 1091 with operation adapted for normal speed until a new base station cell is selected/acquired at block 1011. While on the city streets, for example, processor 303 may maintain operations adapted for normal speed as wireless terminal UE moves from one normal speed base station cell to another as long as a normal speed indication is received by processor 303 (through transceiver 301) for each of the base station cells.

Once the user of the wireless terminal UE leaves the city and drives onto a highway, wireless terminal UE may enter a medium speed environment (with increased driving speeds). Processor 303 may thus select/acquire a new base station cell in the medium speed environment at block 1011. Accordingly, processor 303 may receive the medium speed indication through transceiver 301 at block 1021, processor 303 may determine that the indication is a medium speed indication at block 1031, processor 303 may adapt operation of the wireless terminal for medium speed operation at block 1081, and processor 303 may provide communication through the selected/acquired base station cell at block 1091 with operation adapted for medium speed until a new base station cell is selected/acquired at block 1011. While on the highway, for example, processor 303 may maintain operations adapted for medium speed as wireless terminal UE moves from one medium speed base station cell to another as long as a medium speed indication is received by processor 303 (through transceiver 301) for each of the base station cells. Once the user leaves the highway, the wireless terminal may enter another normal speed environment and processor 303 may adapt operations yet again to normal speed operations in accordance with operations of FIG. 10.

While three different environments (i.e., normal, medium, and high speed environments) are discussed above by way of example with respect to FIG. 10, a wireless terminal may be adaptable to fewer or more different speeds. For example, a wireless terminal UE may be adaptable between only two modes (e.g., for operation in normal and high speed environments), or a wireless terminal may be adaptable between four modes (e.g., for operation in normal, medium, high, and very high speed environments). For purposes of illustration, embodiments adapting operations for normal and high speed environments will be discussed. Moreover, while normal and high speed environments are discussed by way of example with respect to environments in city traffic and on a high speed train, the terms normal and high speed may refer to any two different environments with network base stations adapted to different speeds of wireless terminal motion.

According to some embodiments, processor 303 may adapt operation to communicate in the high-speed environment at block 1081 by using a first layer 1 (L1) measurement period to communicate through a cell in a high-speed environment, and processor 303 may adapt operation to communicate in the normal-speed environment at block 1041 by using a second layer 1 (L1) measurement period to communicate through a cell in the normal-speed environment. Moreover, the first and second layer 1 measurement periods may be different. For example, the first layer 1 measurement period (used in the high speed environment) may be less than the second layer one measurement period (used in the low speed environment). Moreover, the first and second measurement periods may be used to measure Reference Signal Received Power (RSRP), CSI Reference Signal Receive Power (CSI-RSRP), Reference Signal Received Quality (RSRQ), and/or Reference Signal Signal to Noise and Interferer Ratio (RS-SINR). For example, measuring Reference Signal Received Power (RSRP) may include measuring CSI Reference Signal Receive Power (CSI-RSRP), and/or measuring Reference Signal Received Quality (RSRQ) may include measuring Reference Signal Signal to Noise and Interferer Ratio (RS-SINR).

According to some embodiments, processor 303 may adapt operation to communicate in the high-speed environment at block 1081 by using a first measurement time to detect a new cell when communicating through a first cell in a high-speed environment, and processor 303 may adapt operation to communicate in the normal-speed environment at block 1041 by using a second measurement time to detect a new cell when communicating through the second cell in the normal-speed environment. For example, the first measurement time may be less than the second measurement time.

According to some embodiments, processor 303 may adapt operation to communicate in the high-speed environment at block 1081 by using a first evaluation time to evaluate whether a cell meets a reselection criteria and using a plurality of the first measurement times to detect the cell, and processor 303 may adapt operation to communicate in the normal-speed environment at block 1041 by using a second evaluation time to evaluate whether a cell meets a reselection criteria and using a plurality of the second measurement times to detect the cell. For example, the first evaluation time may be less than the second evaluation time.

According to some embodiments, processor 303 may adapt operation to communicate in the high-speed environment at block 1081 by using first Radio Link Monitoring (RLM) thresholds to communicate with the first network node (BS-1) in the high-speed environment, and processor 303 may adapt operation to communicate in the normal-speed environment at block 1041 by using second Radio Link Monitoring (RLM) thresholds to communicate with the second network node (BS-2) in the normal-speed environment. Moreover, the first and second RLM thresholds may be different. For example, the first RLM thresholds may include a first in-sync threshold and a first out-of-sync threshold, the second RLM thresholds may include a second in-sync threshold and a second out-of-sync threshold, the second in-sync threshold may be less than the first in-sync threshold, and wherein the second out-of-sync threshold may be less than the first out-of-sync threshold.

According to some embodiments, processor 303 may adapt operation to communicate in the high-speed environment at block 1081 by using a first filter time constant for radio channel estimation when communicating through the cell in the high-speed environment, and processor 303 may adapt operation to communicate in the normal-speed environment at block 1041 by using a second filter time constant for radio channel estimation when communicating through the second cell in the normal-speed environment. For example, the second filter time constant may be greater than the first filter time constant.

According to some embodiments, processor 303 may adapt operation to communicate in the high-speed environment at block 1081 by using a first time period for an estimation filter used to estimate Channel State Information CSI when communicating through the cell in the high-speed environment, and processor 303 may adapt operation to communicate in the normal-speed environment at block 1041 by using a second time period for an estimation filter used to estimate Channel State Information CSI when communicating through the cell in the normal-speed environment. For example, the second time period may be shorter than the first time period.

According to some embodiments, processor 303 may adapt operation to communicate in the high-speed environment comprises using a first oscillator circuit to time a sleep mode when communicating through the first cell in the high-speed environment, and processor 303 may adapt operation to communicate in the normal-speed environment at block 1041 by using a second oscillator circuit to time a sleep mode when communicating through the second cell in the normal-speed environment, with the first and second oscillator circuits being different. For example, a first oscillator frequency of the first oscillator circuit may be higher than a second oscillator frequency of the second oscillator circuit. Moreover, the first oscillator circuit may enable time to be tracked more accurately than the second oscillator circuit. Accordingly, the first oscillator circuit may have a first oscillator frequency, the second oscillator circuit may have a second oscillator frequency, and the first oscillator frequency may be higher than the second oscillator frequency so that the first oscillator circuit can be used to more accurately track time than the second oscillator circuit.

According to some embodiments, processor 303 may adapt operation to communicate in the high-speed environment at block 1081 by using a first wake up margin before a measurement window to communicate through the cell in the high-speed environment, and processor 303 may adapt operation to communicate in the normal-speed environment at block 1041 by using a second wake up margin before a measurement window to communicate through the cell in the normal-speed environment. For example, the first wake up margin may be longer than the second wake up margin.

According to some embodiments, processor 303 may adapt operation to communicate in the high-speed environment at block 1081 by taking measurement samples in DRX and/or idle mode at a first time interval when communicating through the cell in the high-speed environment, and processor 303 may adapt operation to communicate in the normal-speed environment at block 1041 by taking measurement samples in DRX and/or idle mode at a second time interval when communicating through the cell in the normal-speed environment. For example, the first time interval may be shorter than the second time interval.

According to some embodiments, processor 303 may adapt operation to communicate in the high-speed environment at block 1081 by using a first threshold to detect candidate cells for handover and/or reselection when communicating through the first cell in the high-speed environment, and processor 303 may adapt operation to communicate in the normal-speed environment at block 1041 by using a second threshold to detect candidate cells for handover and/or reselection when communicating through the second cell in the normal-speed environment. For example, the first threshold may be lower than the second threshold.

According to some embodiments, processor 303 may adapt operation to communicate in the high-speed environment at block 1081 by removing information for a previous serving cell in memory responsive to initiating communication through the first cell in the high-speed environment, and processor 303 may adapt operation to communicate in the normal-speed environment at block 1041 by maintaining information for a previous serving cell in memory after initiating communication with the second cell in the normal-speed environment.

According to some embodiments, processor 303 may adapt operation to communicate in the high-speed environment at block 1081 by using a first time duration for inter-frequency/inter-RAT measurement occasions when communicating through the cell in the high-speed environment, and processor 303 may adapt operation to communicate in the normal-speed environment at block 1041 by using a second time duration for inter-frequency/inter-RAT measurement occasions when communicating through the cell in the normal-speed environment. For example, the first time duration may be shorter than the second time duration.

According to some embodiments, processor 303 may adapt operation to communicate in the high-speed environment at block 1081 by adapting a layer 3 (L3) parameter to have a first layer 3 parameter value to communicate through the cell in the high-speed environment, and processor 303 may adapt operation to communicate in the normal-speed environment at block 1041 by adapting the layer 3 (L3) parameter to have a second layer 3 parameter value to communicate through the cell in the normal-speed environment, with the first and second layer 3 parameter values being different.

According to some embodiments, processor 303 may adapt operation to communicate in the high-speed environment at block 1081 by using a first averaging time to estimate Channel State Information (CSI) to communicate through the cell in the high-speed environment, and processor 303 may adapt operation to communicate in the normal-speed environment at block 1041 by using a second averaging time to estimate Channel State Information (CSI) to communicate through the cell in the normal-speed environment, with the first and second averaging times being different.

According to some embodiments, processor 303 may adapt operation to communicate in the high-speed environment at block 1081 by using a first number of subframes to estimate Channel State information (CSI) to communicate through the cell in the high-speed environment, and processor 303 may adapt operation to communicate in the normal-speed environment at block 1041 by using a second number of subframes to estimate Channel State Information (CSI) to communicate through the second cell in the normal-speed environment, with the first and second numbers of subframes being different.

According to some embodiments, processor 303 may receive each of the high, medium, and/or normal speed indication(s) as an element of system information through the first cell. According to some other embodiments, processor 303 may receive each of the high, medium, and/or normal speed indications as an element of a handover message for a handover from the second cell to the first cell.

Operations of a wireless terminal UE according to additional embodiments will now be discussed in greater detail below with respect to the flow chart of FIG. 11. Operations of blocks 1011, 1021, 1031, 1041, 1061, 1081, and 1091 are the same as and/or similar to the same numbered blocks of FIG. 10. Accordingly, further discussion of these blocks may be reduced/omitted for the sake of conciseness.

In addition to operations discussed above with respect to FIG. 10, processor 303 may receive a request (through transceiver 301) for a capability of the wireless terminal at block 1013. Responsive to receiving the request, processor 303 may transmit a high-speed capability indication from the wireless terminal through transceiver 301 to the selected/acquired cell at block 1015. Once processor 303 has transmitted its high speed capability indication at block 1015, the base station cell may respond with a high speed indication at blocks 1021 and 1031 as discussed above with respect to FIG. 10. On the other hand, if no request for capability is received from the selected/acquired cell at block 1013, processor 303 may adapt operation of the wireless terminal for a normal speed environment at block 1041.

Operations of wireless terminal UE according to additional embodiments are illustrated in FIG. 12. As discussed above, processor 303 may receive a high speed indication for a service cell at block 1021/1031 of FIGS. 10/11. As long the wireless terminal UE is a high speed environment (e.g., in communication with a serving cell for which a high speed indication has been received) at block 1211, processor 303 may store (1221) information relating to communication through the cell at block 1221, with the information including at least one of a timestamp, a location of the wireless terminal, a cell identification, and/or carrier information. In addition, processor may transmit the information through transceiver 301 and the cell at block 1231.

Operations of a base station BS in a wireless communication network will now be discussed in greater detail below with respect to the flow chart of FIG. 13. At block 1311, base station processor 203 may provide communication service through a cell to a plurality of wireless terminals in a high-speed environment using transceiver 201. At block 1321, processor 203 may accept a wireless terminal UE (e.g., responsive to cell selection, cell reselection, handover, RRC connection re-establishment, RRC connection release with redirection, PCell or PCC change in carrier aggregation, etc.). Responsive to accepting the wireless terminal at block 1321, processor 203 may transmit a request for a capability of the wireless terminal through the cell using transceiver 201 at block 1331. After transmitting the request, processor 203 may receive a high-speed capability indication from the wireless terminal through the cell using transceiver 203 at block 1341 (with the high-speed capability indication being responsive to the request of block of block 1331). Responsive to receiving the high-speed capability indication from the wireless terminal at block 1341, processor 203 may transmit a high-speed indication through the cell using transceiver 203 to the wireless terminals at block 1351, with the high-speed indication indicating that the cell is adapted to operate in a high-speed environment.

Example Embodiments

Embodiment 1. A method of operating a wireless terminal (UE), the method comprising: receiving (1021, 1031) a high-speed indication for a cell of a network node (BS-1) indicating that the cell is adapted to operate in a high-speed environment; and adapting operation (1081) of the wireless terminal (UE) to communicate through the cell of the network node (BS-1) in the high-speed environment responsive to receiving the high-speed indication.

Embodiment 2. The method of Embodiment 1, wherein the cell is a first cell and the network communication link is a first network communication link, the method further comprising: adapting operation (1041) of the wireless terminal (UE) to communicate through a second cell of a network node (BS-2) in a normal-speed environment.

Embodiment 3. The method of Embodiment 2 further comprising: receiving (1021, 1031) a normal-speed indication for the second cell indicating that the second cell is adapted to operate in the normal-speed environment; wherein adapting operation of the wireless terminal (UE) to communicate through the second cell comprises adapting operation of the wireless terminal (UE) to communicate through the second cell in the normal-speed environment responsive to receiving the normal-speed indication.

Embodiment 4. The method of Embodiment 3 further comprising: receiving (1021, 1031) a medium-speed indication for a third cell of a network node (BS-3) indicating that the third cell is adapted to operate in a medium-speed environment; and adapting operation (1061) of the wireless terminal (UE) to communicate through the third cell in the medium-speed environment responsive to receiving the medium-speed indication.

Embodiment 5. The method of any of Embodiments 2-4 wherein adapting operation to communicate in the high-speed environment comprises using a first layer 1 (L1) measurement period to communicate through the first cell in the high-speed environment, wherein adapting operation to communicate in the normal-speed environment comprises using a second layer 1 (L1) measurement period to communicate through the second cell in the normal-speed environment, and wherein the first and second layer 1 measurement periods are different.

Embodiment 6. The method of Embodiment 5 wherein the first layer 1 measurement period is less than the second layer one measurement period.

Embodiment 7. The method of Embodiment 6 wherein the first and second measurement periods are used to measure Reference Signal Received Power (RSRP) and/or Reference Signal Received Quality (RSRQ).

Embodiment 8. The method of any of Embodiments 2-7 wherein adapting operation to communicate in the high-speed environment comprises using a first measurement time to detect a new cell when communicating through the first cell in the high-speed environment, wherein adapting operation to communicate in the normal-speed environment comprises using a second measurement time to detect a new cell when communicating through the second cell in the normal-speed environment, and wherein the first measurement time is less than the second measurement time.

Embodiment 9. The method of any of Embodiments 2-7 wherein adapting operation to communicate in the high-speed environment comprises using a first evaluation time to evaluate whether a cell meets a reselection criteria and using a plurality of the first measurement times to detect the cell, wherein adapting operation to communicate in the normal-speed environment comprises using a second evaluation time to evaluate whether a cell meets a reselection criteria and using a plurality of the second measurement times to detect the cell, and wherein the first evaluation time is less than the second evaluation time.

Embodiment 10. The method of any of Embodiments 2-7 wherein adapting operation to communicate in the high-speed environment comprises using first Radio Link Monitoring (RLM) thresholds to communicate with the first network node (BS-1) in the high-speed environment, wherein adapting operation to communicate in the normal-speed environment comprises using second Radio Link Monitoring (RLM) thresholds to communicate with the second network node (BS-2) in the normal-speed environment, and wherein the first and second RLM thresholds are different.

Embodiment 11. The method of Embodiment 10 wherein the first RLM thresholds include a first in-sync threshold and a first out-of-sync threshold, wherein the second RLM thresholds include a second in-sync threshold and a second out-of-sync threshold, wherein the second in-sync threshold is less than the first in-sync threshold, and wherein the second out-of-sync threshold is less than the first out-of-sync threshold.

Embodiment 12. The method of any of Embodiments 2-11 wherein adapting operation to communicate in the high-speed environment comprises using a first filter time constant for radio channel estimation when communicating through the first cell in the high-speed environment, wherein adapting operation to communicate in the normal-speed environment comprises using a second filter time constant for radio channel estimation when communicating through the second cell in the normal-speed environment, and wherein the second filter time constant is greater than the first filter time constant.

Embodiment 13. The method of any of Embodiments 2-12 wherein adapting operation to communicate in the high-speed environment comprises using a first time period for an estimation filter used to estimate Channel State Information CSI when communicating through the first cell in the high-speed environment, wherein adapting operation to communicate in the normal-speed environment comprises using a second time period for an estimation filter used to estimate Channel State Information CSI when communicating through the second cell in the normal-speed environment, and wherein the second time period is shorter than the first time period.

Embodiment 14. The method of any of Embodiments 2-13 wherein adapting operation to communicate in the high-speed environment comprises using a first oscillator circuit to time a sleep mode when communicating through the first cell in the high-speed environment, wherein adapting operation to communicate in the normal-speed environment comprises using a second oscillator circuit to time a sleep mode when communicating through the second cell in the normal-speed environment, and wherein the first and second oscillator circuits are different.

Embodiment 15. The method of Embodiment 14, wherein a first oscillator frequency of the first oscillator circuit is higher than a second oscillator frequency of the second oscillator circuit.

Embodiment 16. The method of any of Embodiments 14-15 wherein the first oscillator circuit enables time to be tracked more accurately than the second oscillator circuit.

Embodiment 17. The method of Embodiment 16 wherein the first oscillator circuit has a first oscillator frequency, wherein the second oscillator circuit has a second oscillator frequency, wherein the first oscillator frequency is higher than the second oscillator frequency so that the first oscillator circuit can be used to more accurately track time than the second oscillator circuit.

Embodiment 18. The method of any of Embodiments 2-17 wherein adapting operation to communicate in the high-speed environment comprises using a first wake up margin before a measurement window to communicate through the first cell in the high-speed environment, wherein adapting operation to communicate in the normal-speed environment comprises using a second wake up margin before a measurement window to communicate through the second cell in the normal-speed environment, and wherein the first wake up margin is longer than the second wake up margin.

Embodiment 19. The method of any of Embodiments 2-18 wherein adapting operation to communicate in the high-speed environment comprises taking measurement samples in DRX and/or idle mode at a first time interval when communicating through the first cell in the high-speed environment, wherein adapting operation to communicate in the normal-speed environment comprises taking measurement samples in DRX and/or idle mode at a second time interval when communicating through the second cell in the normal-speed environment, and wherein the first time interval is shorter than the second time interval.

Embodiment 20. The method of any of Embodiments 2-19 wherein adapting operation to communicate in the high-speed environment comprises using a first threshold to detect candidate cells for handover and/or reselection when communicating through the first cell in the high-speed environment, wherein adapting operation to communicate in the normal-speed environment comprises using a second threshold to detect candidate cells for handover and/or reselection when communicating through the second cell in the normal-speed environment, and wherein the first threshold is lower than the second threshold.

Embodiment 21. The method of any of Embodiments 2-20 wherein adapting operation to communicate in the high-speed environment comprises removing information for a previous serving cell in memory responsive to initiating communication through the first cell in the high-speed environment, and wherein adapting operation to communicate in the normal-speed environment comprises maintaining information for a previous serving cell in memory after initiating communication with the second cell in the normal-speed environment.

Embodiment 22. The method of any of Embodiments 2-21 wherein adapting operation to communicate in the high-speed environment comprises using a first time duration for inter-frequency/inter-RAT measurement occasions when communicating through the first cell in the high-speed environment, wherein adapting operation to communicate in the normal-speed environment comprises using a second time duration for inter-frequency/inter-RAT measurement occasions when communicating through the second cell in the normal-speed environment, and wherein the first time duration is shorter than the second time duration.

Embodiment 23. The method of any of Embodiments 2-22 wherein adapting operation to communicate in the high-speed environment comprises adapting a layer 3 (L3) parameter to have a first layer 3 parameter value to communicate through the first cell in the high-speed environment, wherein adapting operation to communicate in the normal-speed environment comprises adapting the layer 3 (L3) parameter to have a second layer 3 parameter value to communicate through the second cell in the normal-speed environment, and wherein the first and second layer 3 parameter values are different.

Embodiment 24. The method of any of Embodiments 2-23 wherein adapting operation to communicate in the high-speed environment comprises using a first averaging time to estimate Channel State Information (CSI) to communicate through the first cell in the high-speed environment, wherein adapting operation to communicate in the normal-speed environment comprises using a second averaging time to estimate Channel State Information (CSI) to communicate through the second cell in the normal-speed environment, and wherein the first and second averaging times are different.

Embodiment 25. The method of any of Embodiments 2-24 wherein adapting operation to communicate in the high-speed environment comprises using a first number of subframes to estimate Channel State information (CSI) to communicate through the first cell in the high-speed environment, wherein adapting operation to communicate in the normal-speed environment comprises using a second number of subframes to estimate Channel State Information (CSI) to communicate through the second cell in the normal-speed environment, and wherein the first and second numbers of subframes are different.

Embodiment 26. The method of any of Embodiments 1-25 further comprising: transmitting (1015) a high-speed capability indication from the wireless terminal through the first cell; wherein receiving the high-speed indication for the first cell comprises receiving the high-speed indication through the first cell after transmitting the high-speed capability.

Embodiment 27. The method of Embodiment 26 further comprising: receiving (1013) a request for a capability of the wireless terminal; wherein transmitting the capability indication comprises transmitting the capability indication responsive to receiving the request for a capability.

Embodiment 28. The method of any of Embodiments 1-27 wherein receiving the high-speed indication comprises receiving the high-speed information as an element of system information through the first cell.

Embodiment 29. The method of any of Embodiments 1-28 wherein receiving the high-speed indication comprises receiving the high-speed information as an element of a handover message for a handover from the second cell to the first cell.

Embodiment 30. The method of any of Embodiments 1-29 further comprising: responsive to the high-speed indication, storing (1221) information relating to communication through the cell, wherein the information includes at least one of a timestamp, a location of the wireless terminal, a cell identification, and/or carrier information; and transmitting (1231) the information through the cell.

Embodiment 31. The method of any of Embodiments 2-30 wherein the first cell is a cell of a first network node (BS-1), and wherein the second cell is a cell of a second network node (BS-2).

Embodiment 32. The method of any of Embodiments 2-30 wherein the first and second cells are cells of a same network node.

Embodiment 33. A wireless terminal (UE) comprising: a transceiver (301) configured to provide radio communications with a wireless communication network over a radio interface; and a processor (303) coupled with the transceiver, wherein the processor is configured to: receive a high-speed indication for a cell of a network node (BS-1), wherein the high-speed indication indicates that the cell is adapted to operate in a high-speed environment, and wherein the high-speed indication is received through the transceiver; and adapt operation of the wireless terminal (UE) to communicate through the transceiver and the cell in the high-speed environment responsive to receiving the high-speed indication.

Embodiment 34. The wireless terminal (UE) of Embodiment 33 wherein the processor is further configured to perform operations of any of Embodiments 2-32.

Embodiment 35. A wireless terminal (UE), wherein the wireless terminal is adapted to: receive a high-speed indication for a cell of a network node (BS-1) indicating that the cell is adapted to operate in a high-speed environment; and adapt operation of the wireless terminal (UE) to communicate through the cell in the high-speed environment responsive to receiving the high-speed indication.

Embodiment 36. The wireless terminal (UE) of Embodiment 35 wherein the wireless terminal is further adapted to perform operations of any of Embodiments 2-32.

Embodiment 37. A wireless terminal (UE) comprising: a first module configured to receive a high-speed indication for a cell of a network node (BS-1) indicating that the cell is adapted to operate in a high-speed environment; and a second module configured to adapt operation of the wireless terminal (UE) to communicate through the cell in the high-speed environment responsive to receiving the high-speed indication.

Embodiment 38. The wireless terminal (UE) of Embodiment 37 further comprising modules configured to perform operations of any of Embodiments 2-32.

Embodiment 39. A method of operating a node (BS) of a wireless communication network, the method comprising: providing (1311) communication service through a cell to a plurality of wireless terminals in a high-speed environment; and transmitting (1351) a high-speed indication through the cell to one of the plurality of wireless terminals, wherein the high-speed indication indicates that the cell is adapted to operate in a high-speed environment.

Embodiment 40. The method of Embodiment 39 further comprising: receiving (1341) a high-speed capability indication from the wireless terminal through the cell; wherein transmitting the high-speed indication through the cell to the wireless terminal comprises transmitting the high-speed indication responsive to receiving the high-speed capability indication through the cell from the wireless terminal.

Embodiment 41. The method of Embodiment 40 further comprising: transmitting (1331) a request for a capability of the wireless terminal through the cell; wherein receiving the capability indication comprises receiving the capability indication after transmitting the request for a capability of the wireless terminal.

Embodiment 42. A node (BS) of a wireless communication network, the node comprising: a communication interface (201) configured to provide radio communications with a wireless terminal over a radio interface; and a processor (203) coupled with the communication interface, wherein the processor is configured to: provide communication service through the transceiver and a cell to a plurality of wireless terminals in a high-speed environment; and transmit a high-speed indication through the transceiver and the cell to one of the plurality of wireless terminals, wherein the high-speed indication indicates that the cell is adapted to operate in a high-speed environment.

Embodiment 43. The node of Embodiment 42 wherein the processor is further configured to perform operations of any of Embodiments 40-41.

Embodiment 44. A node (BS) of a wireless communication network, wherein the node is adapted to: provide communication service through a cell to a plurality of wireless terminals in a high-speed environment; and transmit a high-speed indication through the cell to one of the plurality of wireless terminals, wherein the high-speed indication indicates that the cell is adapted to operate in a high-speed environment.

Embodiment 45. The node of Embodiment 44 wherein the node is further adapted to perform operations of any of Embodiments 40-41.

Embodiment 46. A node (BS) of a wireless communication network, wherein the node comprises: a first module configured to provide communication service through a cell to a plurality of wireless terminals in a high-speed environment; and a second module configured to transmit a high-speed indication through the cell to one of the plurality of wireless terminals, wherein the high-speed indication indicates that the cell is adapted to operate in a high-speed environment.

Embodiment 47. The node of Embodiment 46 wherein the node further comprises modules configured to perform operations of any of Embodiments 40-41.

Embodiment 48. The method of Embodiment 6 wherein the first and second measurement periods are used to measure Reference Signal Received Power (RSRP), Reference Signal Received Quality (RSRQ), CSI Reference Signal Receive Power (CSI-RSRP), and/or Reference Signal Signal to Noise and Interferer Ratio (RS-SINR).

Embodiment 49. The method of Embodiment 7 wherein measuring Reference Signal Received Power (RSRP) comprises measuring CSI Reference Signal Receive Power (CSI-RSRP), and/or wherein measuring Reference Signal Received Quality (RSRQ) comprises measuring Reference Signal Signal to Noise and Interferer Ratio (RS-SINR).

ABBREVIATIONS

Abbreviation Explanation
ARFCN Absolute radio-frequency channel number
CGI Cell Global Identity
BSC Base Station Controller
BS Base Station
CID Cell Identity CRS Cell-specific Reference Signal
DL Downlink
DRS Discovery Reference Signal
E-UTRA Evolved Universal Terrestrial Radio Access
EARFCN E-UTRA ARFCN
ESS Enhanced Synchronization Signal
ID Identity
LTE Long Term Evolution
MDT Minimization of drive test
MME Mobility Management Entity
OFDM Orthogonal Frequency Division Multiplexing
EDPCCH Enhanced Dedicated Physical Control Channel
PBCH Physical Broadcast Channel
PCFICH Physical Control format Indicator
PDCCH Physical Downlink Control Channel
PDSCH Physical Downlink Shared Channel
PHICH Physical Hybrid ARQ Indicator Channel
PSS Primary Synchronization Signal
RAT Radio Access Technology
RE Resource Element
RB Resource Block
RNC Radio Network Controller
RRC Radio Resource Control
RRM Radio Resource Management
RSRQ Reference signal received quality
RSRP Reference signal received power
SFN Single Frequency Network
SSS Secondary Synchronization Signal
UE User Equipment
UL Uplink
SON Self Organizing Network
RSSI Received signal strength indicator
OTDOA Observed time difference of arrival
UARFCN Universal Terrestrial Radio Access ARFCN

FURTHER DEFINITIONS

When an element is referred to as being "connected", "coupled", "responsive", or variants thereof to another element, it can be directly connected, coupled, or responsive to the other element or one or more intervening elements may be present. In contrast, when an element is referred to as being "directly connected", "directly coupled", "directly responsive", or variants thereof to another element, there are no intervening elements present. Like numbers refer to like nodes/elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or", abbreviated "/", includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but do not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est.," may be used to specify a particular item from a more general recitation.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. Examples of embodiments of aspects of present inventive concepts explained and illustrated herein include their complimentary counterparts. The same reference numerals or the same reference designators denote the same or similar elements throughout the specification.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit (also referred to as a processor) of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BluRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Other network elements, communication devices and/or methods according to embodiments of inventive concepts will be or become apparent to one with skill in the art upon review of the present drawings and description. It is intended that all such additional network elements, devices, and/or methods be included within this description, be within the scope of the present inventive concepts. Moreover, it is intended that all embodiments disclosed herein can be implemented separately or combined in any way and/or combination.

The invention claimed is:

1. A method of operating a wireless terminal, the method comprising:
    transmitting high-speed capability information to a first network node through a first cell of the first network node, the high-speed capability information indicating the wireless terminal is capable to communicate in a high speed operation mode;
    responsive to transmitting the high-speed capability information, receiving a high-speed indication for the first cell of the first network node indicating that the first cell is adapted to operate in a high-speed environment;
    adapting operation of the wireless terminal to communicate in the high speed operation mode through the first cell of the first network node in the high-speed environment responsive to receiving the high-speed indication, wherein adapting operation to communicate in the high speed operation mode in the high-speed environment comprises using first Radio Link Monitoring (RLM) thresholds to communicate with the first network node in the high-speed environment; and
    adapting operation of the wireless terminal to communicate through a second cell of a second network node in a normal-speed environment, wherein adapting operation to communicate in the normal-speed environment comprises using second Radio Link Monitoring (RLM) thresholds to communicate with the second network node in the normal-speed environment, and wherein the first and second RLM thresholds are different.

2. The method of claim 1 further comprising:
    receiving a normal-speed indication for the second cell indicating that the second cell is adapted to operate in the normal-speed environment;
    wherein adapting operation of the wireless terminal to communicate through the second cell comprises adapting operation of the wireless terminal to communicate through the second cell in the normal-speed environment responsive to receiving the normal-speed indication.

3. The method of claim 2 further comprising:
    receiving a medium-speed indication for a third cell of a third network node indicating that the third cell is adapted to operate in a medium-speed environment; and
    adapting operation of the wireless terminal to communicate through the third cell in the medium-speed environment responsive to receiving the medium-speed indication.

4. The method of claim 1 wherein adapting operation to communicate in the high speed operation mode in the high-speed environment comprises using a first layer 1 measurement period to communicate through the first cell in the high-speed environment, wherein adapting operation to communicate in the normal-speed environment comprises using a second layer 1 measurement period to communicate through the second cell in the normal-speed environment, and wherein the first and second layer 1 measurement periods are different.

5. The method of claim 4 wherein the first layer 1 measurement period is less than the second layer one measurement period.

6. The method of claim 5 wherein the first and second measurement periods are used to measure Reference Signal Received Power (RSRP) and/or Reference Signal Received Quality (RSRQ).

7. The method of claim 1 wherein adapting operation to communicate in the high speed operation mode in the high-speed environment comprises using a first measurement time to detect a new cell when communicating through the first cell in the high-speed environment, wherein adapting operation to communicate in the normal-speed environment comprises using a second measurement time to detect a new cell when communicating through the second cell in the normal-speed environment, and wherein the first measurement time is less than the second measurement time.

8. The method of claim 1 wherein adapting operation to communicate in the high speed operation mode in the high-speed environment comprises using a first evaluation time to evaluate whether a cell meets a reselection criteria and using a plurality of the first measurement times to detect the cell, wherein adapting operation to communicate in the normal-speed environment comprises using a second evaluation time to evaluate whether a cell meets a reselection criteria and using a plurality of the second measurement times to detect the cell, and wherein the first evaluation time is less than the second evaluation time.

9. The method of claim 1 wherein the first RLM thresholds include a first in-sync threshold and a first out-of-sync threshold, wherein the second RLM thresholds include a second in-sync threshold and a second out-of-sync threshold, wherein the second in-sync threshold is less than the first in-sync threshold, and wherein the second out-of-sync threshold is less than the first out-of-sync threshold.

10. The method of claim 1 wherein adapting operation to communicate in the high speed operation mode in the high-speed operation environment comprises using a first filter time constant for radio channel estimation when communicating through the first cell in the high-speed environment, wherein adapting operation to communicate in the normal-speed environment comprises using a second filter time constant for radio channel estimation when communicating through the second cell in the normal-speed environment, and wherein the second filter time constant is greater than the first filter time constant.

11. A wireless terminal comprising:
a transceiver configured to provide radio communications with a wireless communication network over a radio interface; and
a processor coupled with the transceiver, wherein the processor is configured to:
transmit high-speed capability information to a first network node of the wireless communication network through a first cell of the first network node, the high-speed capability information indicating the wireless terminal is capable to communicate in a high speed operation mode;
receive a high-speed indication for the first cell of the first network node responsive to transmitting the high-speed capability information, wherein the high-speed indication indicates that the first cell is adapted to operate in a high-speed environment, and wherein the high-speed indication is received through the transceiver;
adapt operation of the wireless terminal to communicate in the high speed operation mode through the transceiver and the first cell in the high-speed environment responsive to receiving the high-speed indication, wherein adapting operation to communicate in the high speed operation mode in the high-speed environment comprises using first Radio Link Monitoring (RLM) thresholds to communicate with the first network node in the high-speed environment; and
adapt operation of the wireless terminal to communicate through a second cell of a second network node in a normal-speed environment, wherein adapting operation to communicate in the normal-speed environment comprises using second Radio Link Monitoring (RLM) thresholds to communicate with the second network node in the normal-speed environment, and wherein the first and second RLM thresholds are different.

12. The wireless terminal of claim 11 wherein the processor is further configured to,
receive a normal-speed indication for the second cell indicating that the second cell is adapted to operate in the normal-speed environment,
wherein adapting operation of the wireless terminal to communicate through the second cell comprises adapting operation of the wireless terminal to communicate through the second cell in the normal-speed environment responsive to receiving the normal-speed indication.

13. The wireless terminal of claim 12 wherein the processor is further configured to,
receive a medium-speed indication for a third cell of a third network node indicating that the third cell is adapted to operate in a medium-speed environment; and
adapt operation of the wireless terminal to communicate through the third cell in the medium-speed environment responsive to receiving the medium-speed indication.

14. The wireless terminal of claim 11 wherein adapting operation to communicate in the high speed operation mode in the high-speed environment comprises using a first layer 1 measurement period to communicate through the first cell in the high-speed environment, wherein adapting operation to communicate in the normal-speed environment comprises using a second layer 1 measurement period to communicate through the second cell in the normal-speed environment, and wherein the first and second layer 1 measurement periods are different.

15. The wireless terminal of claim 14 wherein the first layer 1 measurement period is less than the second layer one measurement period.

16. The wireless terminal of claim 15 wherein the first and second measurement periods are used to measure Reference Signal Received Power (RSRP) and/or Reference Signal Received Quality (RSRQ).

17. The wireless terminal of claim 11 wherein adapting operation to communicate in the high speed operation mode in the high-speed environment comprises using a first measurement time to detect a new cell when communicating through the first cell in the high-speed environment, wherein adapting operation to communicate in the normal-speed environment comprises using a second measurement time to detect a new cell when communicating through the second cell in the normal-speed environment, and wherein the first measurement time is less than the second measurement time.

18. The wireless terminal of claim 11 wherein adapting operation to communicate in the high speed operation mode in the high-speed environment comprises using a first evaluation time to evaluate whether a cell meets a reselection criteria and using a plurality of the first measurement times to detect the cell, wherein adapting operation to communicate in the normal-speed environment comprises using a second evaluation time to evaluate whether a cell meets a reselection criteria and using a plurality of the second measurement times to detect the cell, and wherein the first evaluation time is less than the second evaluation time.

19. The wireless terminal of claim 11 wherein the first RLM thresholds include a first in-sync threshold and a first out-of-sync threshold, wherein the second RLM thresholds include a second in-sync threshold and a second out-of-sync threshold, wherein the second in-sync threshold is less than the first in-sync threshold, and wherein the second out-of-sync threshold is less than the first out-of-sync threshold.

20. The wireless terminal of claim 11 wherein adapting operation to communicate in the high speed operation mode in the high-speed environment comprises using a first filter time constant for radio channel estimation when communicating through the first cell in the high-speed environment, wherein adapting operation to communicate in the normal-speed environment comprises using a second filter time constant for radio channel estimation when communicating through the second cell in the normal-speed environment, and wherein the second filter time constant is greater than the first filter time constant.

* * * * *